United States Patent
Taguchi

(10) Patent No.: US 11,922,165 B2
(45) Date of Patent: Mar. 5, 2024

(54) PARAMETER VECTOR VALUE PROPOSAL APPARATUS, PARAMETER VECTOR VALUE PROPOSAL METHOD, AND PARAMETER OPTIMIZATION METHOD

(71) Applicant: KABUSHIKI KAISHA TOSHIBA, Tokyo (JP)

(72) Inventor: Yasunori Taguchi, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/942,285

(22) Filed: Sep. 12, 2022

(65) Prior Publication Data
US 2023/0138810 A1 May 4, 2023

(30) Foreign Application Priority Data
Nov. 1, 2021 (JP) .................. 2021-178991

(51) Int. Cl.
G06F 18/213 (2023.01)
G06F 9/30 (2018.01)
G06F 9/54 (2006.01)
G06F 18/21 (2023.01)

(52) U.S. Cl.
CPC .......... G06F 9/30036 (2013.01); G06F 9/545 (2013.01)

(58) Field of Classification Search
None
See application file for complete search history.

(56) References Cited

U.S. PATENT DOCUMENTS

| | | | |
|---|---|---|---|
| 9,087,294 B2 * | 7/2015 | Kojaku | G06N 5/02 |
| 11,803,142 B1 * | 10/2023 | Shinohara | G03G 15/2053 |
| 2006/0106530 A1 * | 5/2006 | Horvitz | G08G 1/0104 |
| | | | 340/933 |
| 2008/0040037 A1 * | 2/2008 | de Lamare | G01S 7/36 |
| | | | 379/416 |

(Continued)

FOREIGN PATENT DOCUMENTS

| | | |
|---|---|---|
| JP | 2020-027370 A | 2/2020 |
| JP | 2022-074880 A | 5/2022 |

OTHER PUBLICATIONS

Kirschner et al., "Adaptive and Safe Bayesian Optimization in High Dimensions via One-Dimensional Subspaces", Proceedings of the 36th International Conference on Machine Learning, vol. 97, PMLR, 2019, 10 pages.

*Primary Examiner* — Hyun Nam
(74) *Attorney, Agent, or Firm* — Oblon, McClelland, Maier & Neustadt, L.L.P.

(57) ABSTRACT

A storage stores observation data (a set of pairs each consists of a parameter vector value representing a point in a D-dimensional space and an observation value of an objective function at the point). A processor determines a low-dimensional search space (R (2≤R<D)-dimensional affine subspace passes through a point represented by a parameter vector value in the D-dimensional space), extracts data (a set of pairs corresponding to points at which similarity to a point included in the search space are more than a predetermined value. The points are among points in the D-dimensional space represented by parameter vector values included in the observation data), and proposes a parameter vector value representing a next point based on the extracted data.

14 Claims, 7 Drawing Sheets

(56) References Cited

U.S. PATENT DOCUMENTS

| | | | |
|---|---|---|---|
| 2012/0109604 A1* | 5/2012 | Chen | G01V 11/00 703/2 |
| 2012/0317060 A1* | 12/2012 | Jebara | G06N 20/00 706/21 |
| 2020/0050717 A1 | 2/2020 | Kiribuchi et al. | |
| 2020/0184131 A1* | 6/2020 | Zhang | G06N 20/20 |
| 2022/0138194 A1 | 5/2022 | Nakagawa et al. | |
| 2023/0138810 A1* | 5/2023 | Taguchi | G06F 9/545 712/4 |
| 2023/0347948 A1* | 11/2023 | Wen | G06N 20/10 |

\* cited by examiner

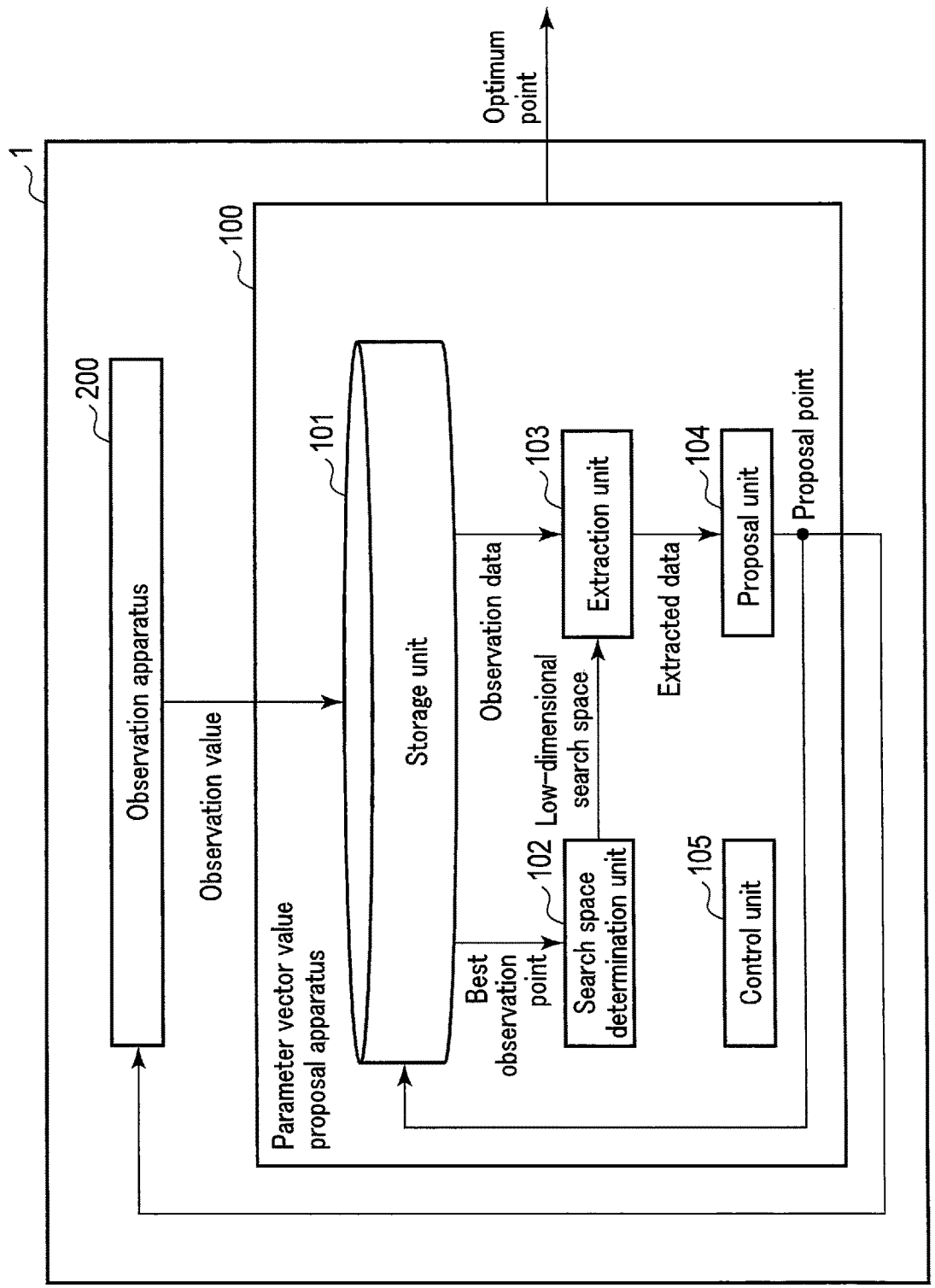
F I G. 1

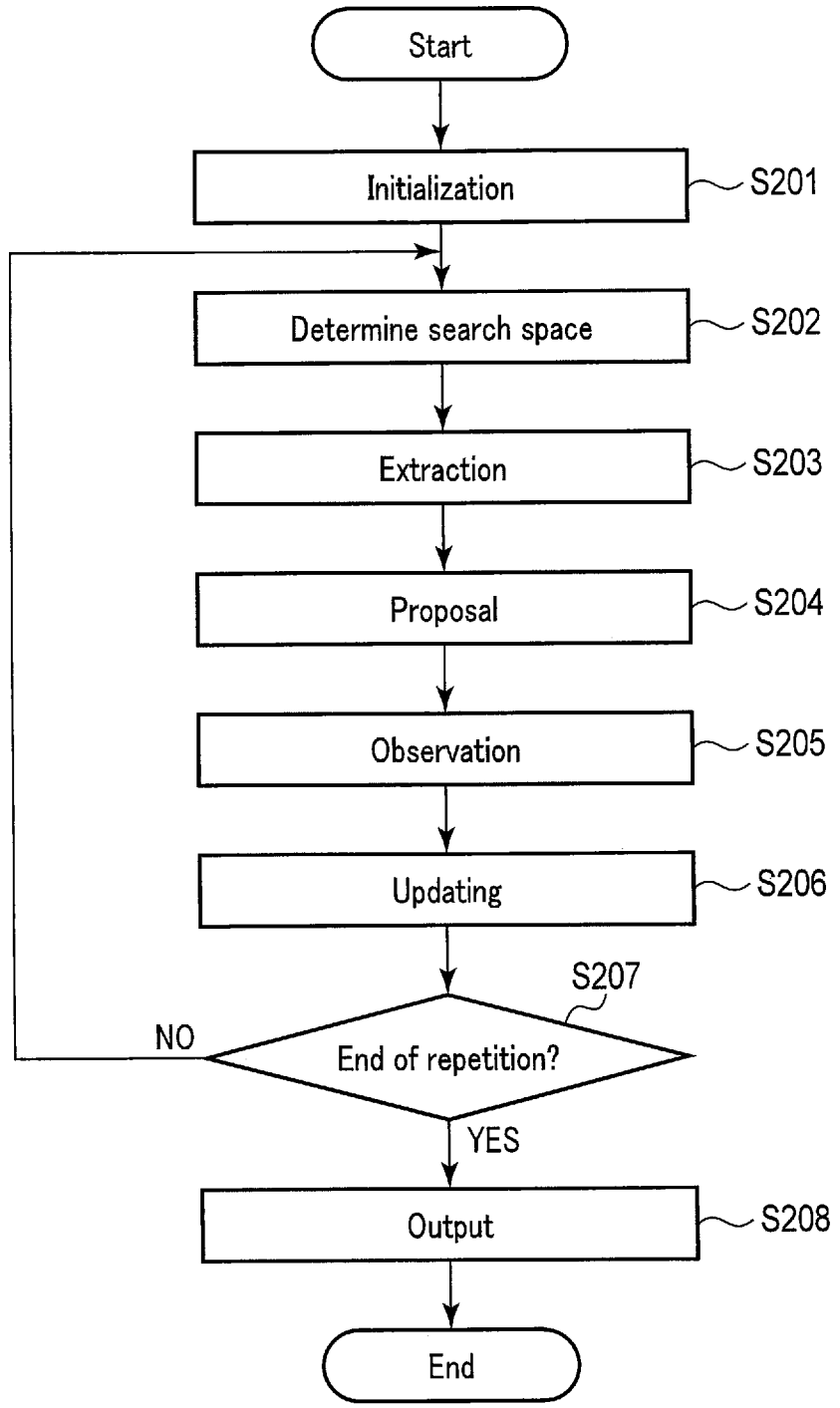
F I G. 2

S301: $t = 0$
S302: $D_0 = \{(x_n, y_n) | n = 0, 1, \ldots, N_0 - 1\}$
S303: for $t = 1, 2, \ldots, T$
S304:   $b_{t-1} = \underset{n=0,1,\ldots,N_{t-1}-1}{\arg\min} y_n$
S305:   set $U_t$
S306:   $S_t = x_{b_{t-1}} + U_t$
S307:   $E_t = \{(x_n, y_n) | k(x_n, x') \geq T_t, n = 0, 1, \ldots, N_{t-1} - 1\}$
S308:   $x_{N_{t-1}} = \underset{x \in S_t}{\arg\max}\, a_t(x | E_t)$
S309:   $y_{N_{t-1}} = f(x_{N_{t-1}}) + \varepsilon_{N_{t-1}}$
S310:   $D_t = D_{t-1} \cup \{(x_{N_{t-1}}, y_{N_{t-1}})\}$
S311:   $N_t = N_{t-1} + 1$
S312: end for
S313: $b_T = \underset{n=0,1,\ldots,N_T-1}{\arg\min} y_n$
S314: output $x_{b_T}$

FIG. 3

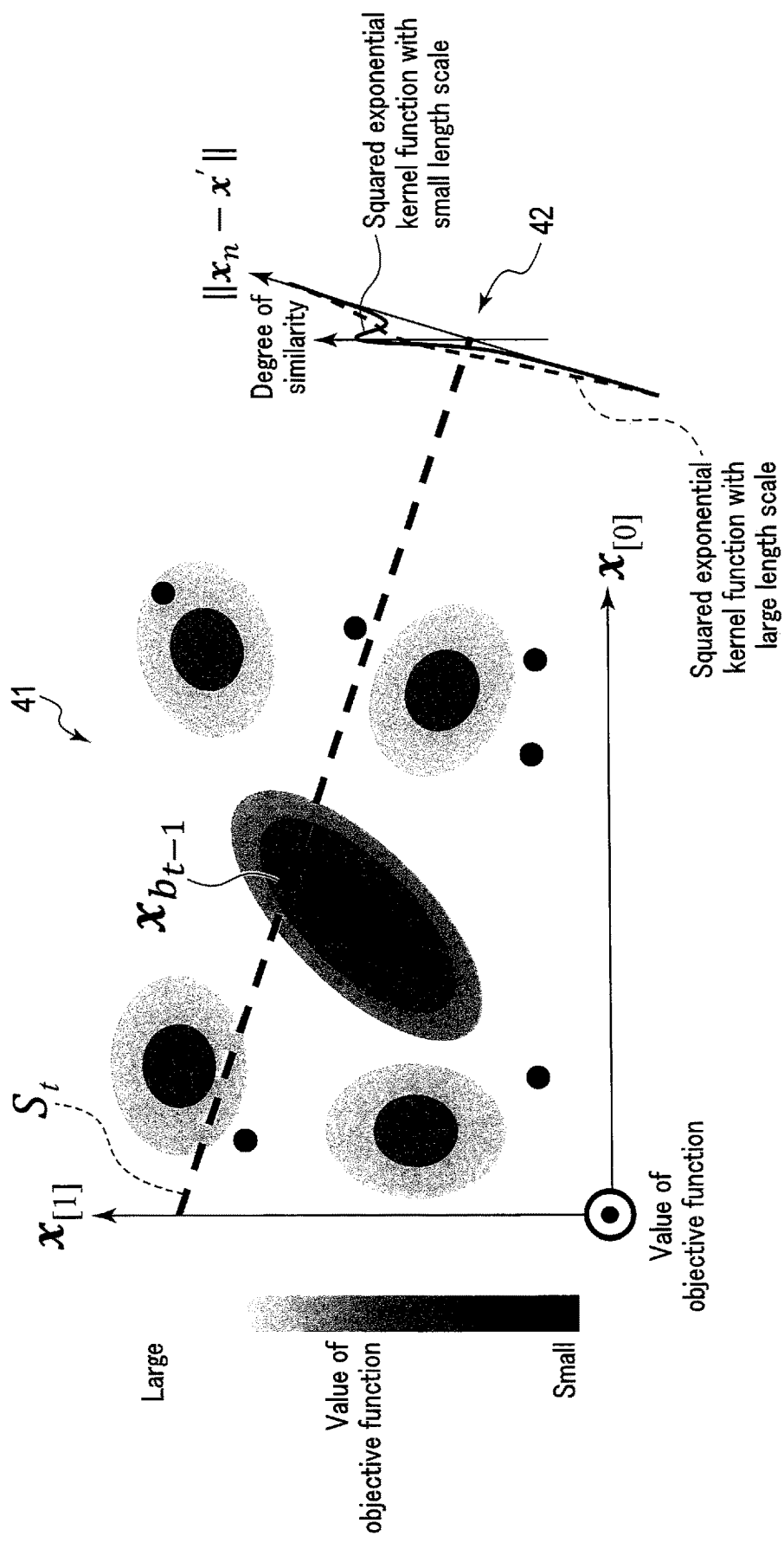
F I G. 4

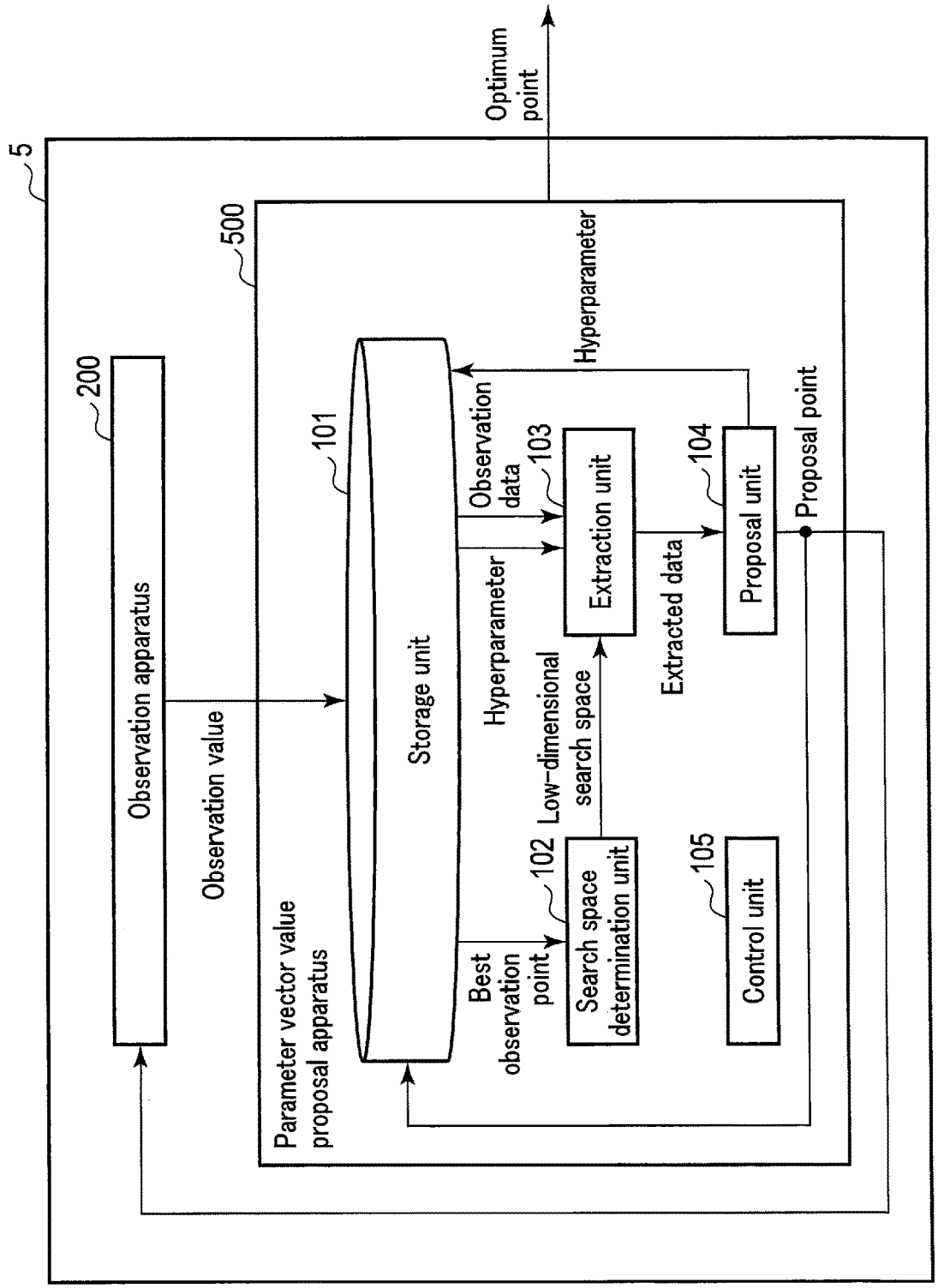
F I G. 5

S601: $t = 0$
S602: $D_0 = \{(x_n, y_n) | n = 0, 1, ..., N_0 - 1\}$
S603: $t = 1$
S604: for $j = 0, 1, ..., J - 1$ do
S605:   for $g = 0, 1, ..., G - 1$ do
S606:     $b_{t-1} = \underset{n=0,1,...,N_{t-1}-1}{\arg\min} y_n$
S607:     set $U_t$
S608:     $S_t = x_{b_{t-1}} + U_t$
S609:     $E_t = \{(x_n, y_n) | k(x_n, x') \geq T_t, n = 0, 1, ..., N_{t-1} - 1\}$
S610:     for $l = 0, 1, ..., L - 1$ do
S611:       $x_{N_{t-1}} = \underset{x \in S_t}{\arg\max}\, a_t(x | E_t)$
S612:       $y_{N_{t-1}} = f(x_{N_{t-1}}) + \varepsilon_{N_{t-1}}$
S613:       $D_t = D_{t-1} \cup \{(x_{N_{t-1}}, y_{N_{t-1}})\}$
S614:       $E_t = E_{t-1} \cup \{(x_{N_{t-1}}, y_{N_{t-1}})\}$
S615:       $N_t = N_{t-1} + 1$
S616:       $t = t + 1$
S617:     end for
S618:   end for
S619: end for
S620: $T = LGJ$
S621: $b_T = \underset{n=0,1,...,N_T-1}{\arg\min} y_n$
S622: output $x_{b_T}$

FIG. 6

PARAMETER VECTOR VALUE PROPOSAL APPARATUS, PARAMETER VECTOR VALUE PROPOSAL METHOD, AND PARAMETER OPTIMIZATION METHOD

CROSS-REFERENCE TO RELATED APPLICATIONS

This application is based upon and claims the benefit of priority from Japanese Patent Application No. 2021-178991, filed Nov. 1, 2021, the entire contents of which are incorporated herein by reference.

FIELD

Embodiments described herein relate generally to a parameter vector value proposal apparatus, a parameter vector value proposal method and a parameter optimization method.

BACKGROUND

There are various devices, apparatuses, and application software in our society, and they are composed of various parts. These devices, apparatuses, application software and parts are designed, manufactured and utilized.

At the time of design, there is a case where the devices, apparatuses, application software and parts have their characteristics designed to satisfy the specifications required. In such a case, a parameter vector having one or more parameters that can be adjusted at the time of design is changed to various values, simulations, experiments and questionnaires are conducted so as to acquire a characteristic value representing the characteristics obtained when the design is performed based on those values of the parameter vector, and a parameter vector value that enables that characteristic value to satisfy the specifications is obtained. For example, the characteristics are specifically the performance, manufacturing cost and customer satisfaction of a device, an apparatus, application software and a part. It is preferable that the performance of the apparatus and part is as good as possible, the manufacturing cost is as low as possible, and the customer satisfaction is as high as possible. Where it is preferable that the characteristic value should be large, a parameter vector value that maximizes the characteristic value should be obtained in a shorter time, with less work, and at a low cost. Where it is preferable that the characteristic value should be as small as possible, a parameter vector value that minimizes the characteristic value should be obtained in a shorter time, with less work, and at a low cost.

The act of determining a parameter vector value that maximizes or minimizes the characteristic value is referred to as parameter optimization. A characteristic value that changes in accordance with a parameter vector value is referred to as an objective function. Simulations, experiments, and questionnaires are means for observing the value of the objective function, that is, the characteristic value. The characteristic value relating to each parameter vector value is not known until a characteristic value is observed by executing a simulation, an experiment, and a questionnaire, and the objective function is therefore unknown. In many cases, noise is included when the characteristic value, that is, the value of the objective function, is observed.

There is a case where parameter optimization is used at the time of manufacture. For example, there is a case where a parameter vector value that maximizes the yield at the time of manufacture is obtained, or where a parameter vector value that minimizes the failure rate after shipment is obtained.

There is also a case where parameter optimization is used at the time of use. For example, at the time of initial setting by the user, a parameter vector value is obtained that enables a device, an apparatus, application software, or part delivered to the user to exert maximum performance in the user's usage environment.

Where the number of parameters to be adjusted is represented by D, the dimension of the parameter vector is D. A certain D-dimensional parameter vector value can be regarded as one point in the D-dimensional space. Therefore, the space in which an optimum D-dimensional parameter vector value is searched for is the D-dimensional space. Where the D-dimensional parameter vector does not have an upper limit value or a lower limit value, the range for searching the optimum D-dimensional parameter vector value is the whole of the D-dimensional space. Where the D-dimensional parameter vector has an upper limit value or a lower limit value, that is, where the D-dimensional parameter vector has a domain, the range for searching for the optimum D-dimensional parameter vector value is that domain in the D-dimensional space. The larger the value of D is, the wider will be the search space and the search range, so that optimization becomes more difficult.

BRIEF DESCRIPTION OF THE DRAWINGS

FIG. 1 is a diagram showing a functional configuration example of a parameter optimization system according to an embodiment.

FIG. 2 is a diagram illustrating a flow of a parameter optimization process performed by the parameter optimization system of the embodiment.

FIG. 3 is a diagram showing a pseudo program code included in the parameter optimization process shown in FIG. 2 and performed by a parameter vector value proposal apparatus.

FIG. 4 is a diagram illustrating a state in which the value of an objective function is observed at seven observation points in the D-dimensional space of the case where D=2.

FIG. 5 is a diagram showing a functional configuration example of a parameter optimization system according to modification 9.

FIG. 6 is a diagram showing a pseudo program code which is according to modification 10 and corresponds to the parameter optimization process shown in FIG. 2.

DETAILED DESCRIPTION

Figure 7:
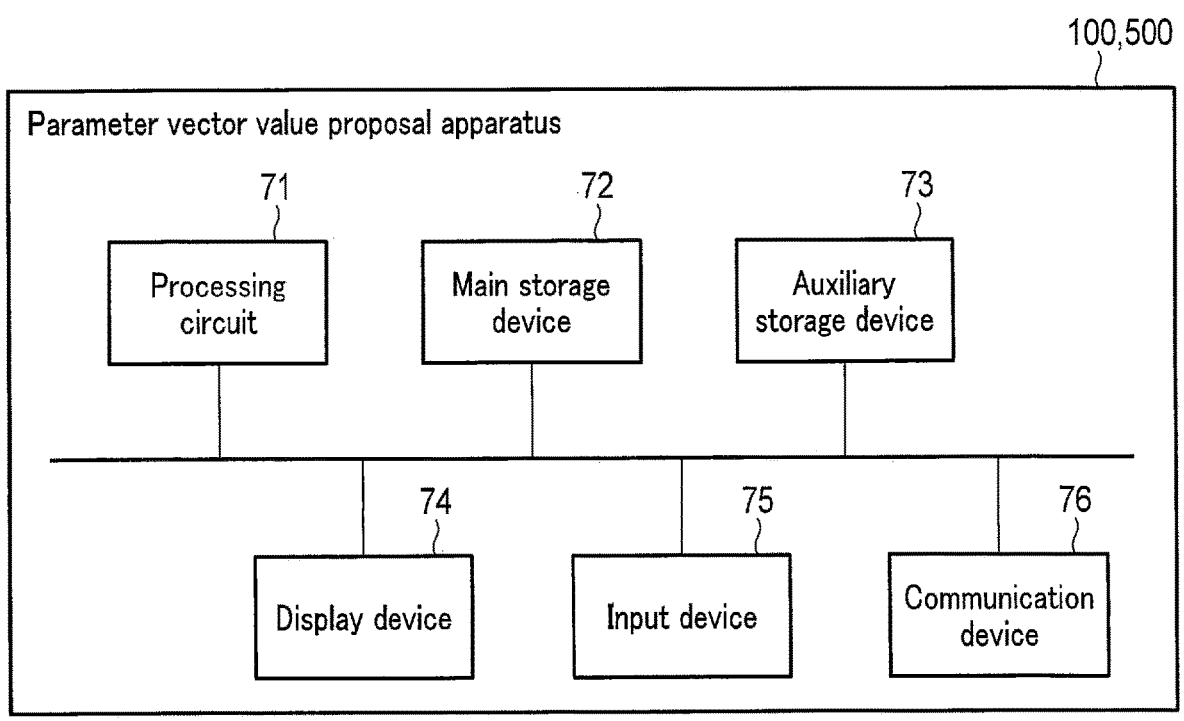
FIG. 7 is a diagram showing a hardware configuration example of the parameter vector value proposal apparatus.

A parameter vector value proposal apparatus according to an embodiment includes a storage device and processing circuitry. The storage device stores observation data, which is a set of pairs each consisting of a parameter vector value representing a point in a D-dimensional space (D is an integer of 2 or more) and an observation value of an objective function at the point. The processing circuitry determines, as a low-dimensional search space, an R-dimensional affine subspace (R is an integer that is not less than 1 and less than D) that passes through a point represented by a predetermined parameter vector value in the D-dimensional space; extracts, as extracted data, a set of pairs corresponding to one or more points at which similarity to a point included in the low-dimensional search space are equal to or more than a predetermined value, the one or more points being among one or more points in the D-dimensional space represented by one or more parameter vector values included in the observation data stored in the storage device; and proposes a parameter vector value representing a point at which a value of the objective function is to be observed next, based on the extracted data.

In the description below, the D-dimensional parameter vector value may be abbreviated simply as a parameter vector value. The description of a domain will be omitted. Even though the description of the domain is omitted, the search range is limited to the domain.

A parameter optimization method is disclosed in Non-Patent Document 1 (J. Kirschner, M. Mutny, N. Hiller, R. Ischebeck, and A. Krause, "Adaptive and safe Bayesian optimization in high dimensions via one-dimensional subspaces," in Proceedings of the 36th International Conference on Machine Learning, vol. 97, pp. 3429-3438, PMLR, 2019). The method disclosed in this document is a Bayesian optimization method adapted for the case where D is an integer of 2 or more, and is known to have good search efficiency where the value of D is large. In this method, the search space is limited to a one-dimensional space in the D-dimensional space, and while the one-dimensional search space is switched from one to another, the proposal of a point where the value of the objective function should be observed next and the observation of the value of the objective function at the proposal point are repeated. As described above, the point is a D-dimensional parameter vector value. The point at which the value of the objective function is observed is referred to as an observation point.

In the proposal of an observation point, an acquisition function is generated instead of the unknown objective function, and the point where the value of the acquisition function is maximum is proposed as a candidate point where the value of the objective function may be minimum. The acquisition function is calculated based on Gaussian process regression. In the description below, Gaussian process regression will be abbreviated as GP regression.

In GP regression, the value of an objective function at an unobserved point is predicted, using one or more points at which an objective function has been observed and observation values which the objective function takes at the one or more points. At the time, the calculation of an inverse matrix is required.

The calculation order of the inverse matrix is $O(N^3)$. N represents the number of points at which the value of the objective function has been observed. As the number of repetitions of the proposal and the observation increases and the value of N increases, the computational cost of the inverse matrix increases.

On the other hand, in the method of Patent Document 1 (Japanese Patent Application No. 2020-185291), the points which are included among N points where the value of an objective function has already been observed and which are to be used for GP regression are limited those points where the distance to a low-dimensional search space whose space dimension is lower than D is equal to or less than a predetermined threshold.

Where the number of points limited is represented by N', the calculation order of the calculation of the inverse matrix is $O(N'^3)$. This reduces the computational cost of the inverse matrix.

However, the method of Patent Document 1 does not show how to determine a threshold value corresponding to the distance to the low-dimensional search space. The accuracy of predicting the value of the objective function at each point in GP regression changes, depending upon which points are to be used from among the N points where the values of objective functions have already been observed. If the points that have a large effect on the prediction accuracy are not utilized, the prediction accuracy will deteriorate. Therefore, if the points to be used for GP regression are determined using a uniform threshold value which is predetermined for the distances to the low-dimensional search space, the prediction accuracy may deteriorate. If the prediction accuracy deteriorates, there is a high possibility that the search efficiency of a parameter vector value will deteriorate. The deterioration of the search efficiency is undesirable even if the calculation cost of the inverse matrix can be reduced.

An object to be solved by the present invention is to provide a parameter vector value proposal apparatus, a parameter vector value proposal method and a parameter optimization method that realize both improvement in the search efficiency of a parameter vector value and reduction in the calculation cost.

In what follows, a parameter vector value proposal apparatus, a parameter vector value proposal method, a parameter optimization method, and a parameter vector value proposal program according to the present embodiment will be described with reference to the accompanying drawings.

FIG. 1 is a diagram showing a functional configuration example of a parameter optimization system 1 according to the present embodiment. As shown in FIG. 1, the parameter optimization system 1 is a computer system including a parameter vector value proposal apparatus 100 and an observation apparatus 200. The parameter vector value proposal apparatus 100 and the observation apparatus 200 are coupled to each other by wire or by wireless. The parameter vector value proposal apparatus 100 is a computer that proposes a parameter vector value (proposal point) at which the value of an objective function is to be observed next. The observation apparatus 200 acquires an observation value of the objective function at the proposal point by observing the value of the objective function at the proposal point. Specifically, the observation is carried out by simulations, experiments, questionnaires, etc., based on parameter values. The parameter optimization system 1 repeats the proposal of a proposal point by the parameter vector value proposal apparatus 100 and the acquisition of the observation value of the objective function at the proposal point by the observation apparatus 200, and outputs the parameter vector value (observation point) corresponding to the minimum observation value as an optimum point. In the description below, the observation value of the objective function may be abbreviated simply as an observation value.

Parameter optimization is performed either for the maximization of the value of the objective function or for the minimization of the value of the objective function. The maximization becomes equivalent to the minimization by multiplying the value of the objective function by −1. For the sake of simplicity, a description will be given of the case where a parameter vector value that minimizes the value of the objective function is calculated. It should be noted, however, that the parameter optimization of the present embodiment is not limited to the minimization. The parameter optimization of the present embodiment can also be applied to the maximization of the value of the objective function.

As shown in FIG. 1, the parameter vector value proposal apparatus 100 includes a storage unit 101, a search space determination unit 102, an extraction unit 103, a proposal unit 104, and a control unit 105.

The storage unit 101 stores a set of pairs each consisting of a D-dimensional parameter vector value and an observation value of an objective function corresponding to the D-dimensional parameter vector value. The data on the set will be referred to as observation data. The parameter vector value represents a point in the D-dimensional space (D is a natural number of 2 or more). The observation value is obtained by the observation apparatus 200 by using a simulation, an experiment, a questionnaire, or the like, based on the corresponding D-dimensional parameter vector value.

The search space determination unit 102 determines an R-dimensional affine subspace (R is an integer not less than 1 and less than D) passing through a point represented by a predetermined parameter vector value in the D-dimensional space, and outputs the determined R-dimensional affine subspace as a low-dimensional search space. As the predetermined parameter vector value, the observation value included among the observation data stored in the storage unit 101 and considered to be the best one is adopted; for example, the parameter vector value corresponding the minimum value is adopted. That observation value is referred to as the best observation value.

The extraction unit 103 refers to one or more points in the D-dimensional space represented by the one or more parameter vector values included in the observation data stored in the storage unit 101, and extracts, as extracted data, a set of pairs corresponding to one or more points at which degrees of similarity to a point included in the low-dimensional search space are equal to or more than a predetermined value.

Based on the extracted data, the proposal unit 104 proposes a parameter vector value representing a point (parameter vector value) at which the value of the objective function is to be observed next. That point will be referred to as a proposal point. The value of the objective function at the proposal point is observed by the observation apparatus 200, and the observation value corresponding to the proposal point is acquired. The pair consisting of the proposal point (parameter vector value) and the observation value corresponding to the proposal point is stored in the storage unit 101.

The control unit 105 comprehensively controls the parameter vector value proposal apparatus 100. Specifically, the control unit 105 controls the storage of observation data in the storage unit 101, the determination of a search space made by the search space determination unit 102, the extraction of extracted data performed by the extraction unit 103, and the proposal of a proposal point by the proposal unit 104, in accordance with the acquisition of an observation value performed by the observation apparatus 200 and until the end condition is satisfied. In order to perform control in accordance with the acquisition of an observation value by the observation apparatus 200, the control unit 105 has a function of monitoring how the storage unit 101 accepts an observation value and a function of monitoring how the proposal unit 104 transmits the observation value to a device external of the parameter vector value proposal apparatus 100. The optimum point (parameter vector value) at the end of the iteration will be referred to as an optimum point. The optimum point is provided to an external device different from the parameter vector value proposal apparatus 100 under the control of the control unit 105.

FIG. 2 is a diagram illustrating a flow of a parameter optimization process performed by the parameter optimization system 1 of the present embodiment. FIG. 3 is a diagram showing a pseudo program code included in the parameter optimization process shown in FIG. 2 and performed by the parameter vector value proposal apparatus. The parameter optimization shown in FIGS. 2 and 3 is executed under the control of the control unit 105 that controls the storage unit 101, the search space determination unit 102, the extraction unit 103 and the proposal unit 104.

As shown in FIG. 2, the control unit 105 first executes initialization of the parameter vector value proposal apparatus 100 (S201). The control unit 105 sets the time t to 0 at the start of S201, as shown in S301 of FIG. 3, and sets the time t to 1 at the end of S201. The time t is a time used for the parameter optimization process, and indicates the number of times the process included in the process loop of FIG. 2 is performed.

In S201, the control unit 105 initializes the storage unit 101 and sends observation data described later to the extraction unit 103. For initialization, at least one pair consisting of a D-dimensional parameter vector value and an observation value of the objective function corresponding to that D-dimensional parameter vector value is stored in the storage unit 101.

Not only in step S201 but also in the other steps, the number of pairs stored in the storage unit 101 as a result of storing data in the storage unit 101 at the time t will be represented by $N_t$. From this definition, the number of pairs stored in the storage unit 101 after one or more pairs are stored in S201 at the time 0 is $N_0$, which is an integer of 1 or more.

The $N_0$ D-dimensional parameter vector values stored in the storage unit 101 at the time 0 are represented by $x_n$ (n=0, 1, ..., $N_0$−1), and the observation value of the objective function corresponding to $x_n$ is represented by $y_n$ (n=0, 1, ..., $N_0$−1). The D-dimensional parameter vector value $x_n$ is a vector, and the observation value $y_n$ is a scalar. The observation value y of the objective function with respect to the D-dimensional parameter vector value x is represented by y=f(x)+ε. It should be noted that f represents an objective function, and ε represents a noise component when the value of the objective function is observed. The noise component ε describes, for example, a Gaussian distribution having a mean of 0 and a standard deviation of σ. Where there is no noise component, σ may be regarded as 0.

Not only in S201 but also in the other steps, the set $D_t$ of $N_t$ pairs stored in the storage unit 101 at the time t is represented by the formula (1) set forth below.

$D_t$ is referred to as observation data at the time t.

$$D_t = \{(x_n, y_n) | n=0, 1, \ldots, N_t-1\} \quad (1)$$

The observation data $D_0$ stored in the storage unit 101 after the initialization in S201 at the time 0 is represented by the formula (2) set forth below, as shown in S302 of FIG. 3. In S301, the observation data $D_0$ is supplied from the storage unit 101 to the extraction unit 103.

$$D_0 = \{(x_n, y_n) | n=0, 1, \ldots, N_0-1\} \quad (2)$$

The observation data $D_0$ may be composed of only the data observed before S201; alternatively, each $x_n$ (n=0, 1, ..., $N_0$−1) is determined at random within the domain for S201, and $y_n$ corresponding to each $x_n$ may be observed by the observation apparatus 200. The observation data may be a combination of these.

As shown in S303 of FIG. 3, subsequent steps S202 to S207 are repeated at the time t=1, 2, ..., T. T is a predetermined upper limit of the time t.

After S201 is performed, the search space determination unit 102 determines a search space (S202). Specifically, in S202, the search space determination unit 102 determines a low-dimensional search space $S_t$ and supplies it to the extraction unit 103. The number of dimensions of the low-dimensional search space $S_t$ is represented by $R_t$. $R_t$ is an integer having a number of dimensions of 1 or more and less than D, and is an integer satisfying $1 \leq R_t < D$. The value of $R_t$ may be changed according to the time t, or may be made constant regardless of the time t. The value of $R_t$ may be a predetermined value or a randomly determined value.

In order to determine the low-dimensional search space $S_t$, the search space determination unit 102 acquires the best observation point from the storage unit 101. The best observation point is an observation point which is among the set $\{y_n | n=0, 1, \ldots, N_{t-1}-1\}$ of observation values included in the observation data $D_{t-1}$ stored in the storage unit 101 and which corresponds to the smallest observation value. This smallest observation value is represented by $y_{b_{t-1}}$, and the best observation point corresponding to $y_{b_{t-1}}$ is represented by $x_{b_{t-1}}$. As shown in S304 of FIG. 3, $b_{t-1}$ is an index represented by the following formula (3).

$$b_{t-1} = \underset{n=0,1,\ldots,N_{t-1}-1}{\operatorname{argmin}} y_n \tag{3}$$

In S202, the search space determination unit 102 determines a low-dimensional search space $S_t$ passing through the best observation point $x_{b_{t-1}}$, as shown in S306 of FIG. 3. The low-dimensional search space $S_t$ is an $R_t$-dimensional affine subspace. $S_t$ is expressed by the formula (4) set forth below. $x_{b_{t-1}}$ is a position vector of $S_t$. $U_t$ is an $R_t$-dimensional linear subspace associated with the $R_t$-dimensional affine subspace $S_t$.

$$\begin{aligned} S_t &= x_{b_{t-1}} + U_t \\ &= \{x_{b_{t-1}} + u_t \mid u_t \in U_t\} \end{aligned} \tag{4}$$

The low-dimensional search space $S_t$, that is, the $R_t$-dimensional affine subspace $S_t$, changes according to the time t shown in the loop of FIG. 2. As $x_{b_{t-1}}$ or $U_t$ changes according to the time t, $S_t$ also changes. As will be described later, since an element is added to the observation data each time the time advances, the best observation point $x_{b_{t-1}}$ may also change according to the time t. $U_t$ changes when $R_t$ changes according to the time t. Even where $R_t$ is a constant value that does not depend on the time t, $U_t$ changes by changing the direction of the linear subspace according to the time t.

After S202 is performed, the extraction unit 103 executes the extraction process (S203). In S203, the extraction unit 103 searches the storage unit 101 for the set $\{x_n | n=0, 1, \ldots, N_{t-1}-1\}$ of observation points included in the observation data $D_{t-1}$ received from the storage unit 101 at the time t, and extracts from the storage unit 101 those pairs corresponding to one or more points at which a similarity to a predetermined point x' included in the low-dimensional search space $S_t$ is equal to or more than a predetermined value $T_t$. The extracted pairs are supplied to the proposal unit 104. The query used when the extraction unit 103 makes an inquiry to the storage unit 101 is not shown in FIG. 1.

As the predetermined point x' included in the low-dimensional search space $S_t$, for example, the same point in $S_t$ is adopted regardless of the observation points $x_n$ (n=0, 1, \ldots, $N_{t-1}-1$). The similarity to the observation point $x_n$ to a predetermined point x' is calculated by $k(x_n, x')$. It should be noted that $k(\cdot, \cdot)$ is a kernel function that evaluates the similarity between two points. As a kernel function, linear kernel, squared exponential kernel, exponential kernel, Matern 3/2 kernel, Matern 5/2 kernel, rational luadratic kernel, ARD squared exponential kernel, ARD exponential kernel, ARD Matern 3/2 kernel, ARD Matern 5/2 kernel, ARD Rational Quadratic kernel, etc. are known. One of these may be adopted as the kernel function, or another kernel function different from the above may be adopted. A Kernel function may include a hyperparameter. As the value of the hyperparameter, a predetermined value may be adopted, or a value may be estimated from the observation data or from extracted data described later.

As shown in S307 of FIG. 3, at the time t, the extraction unit 103 extracts a set $E_t$ of pairs to be extracted from the observation data $D_{t-1}$. $E_t$ is referred to as extracted data. As shown in S307, the extracted data $E_t$ is represented by the following formula (5).

$$E_t = \{(x_n, y_n) | k(x_n, x') \geq T_t, n=0, 1, \ldots, N_{t-1}-1\} \tag{5}$$

The number of elements of the extracted data $E_t$ is represented by $N'_t$. $N'_t$ changes, depending upon the value of $T_t$, and takes a value which is not less than 0 and not more than $N_{t-1}$. A value that permits $N'_t$ to be 1 or more is adopted as $T_t$. For example, $N_{t-1}$ $k(x_n, x')$ (n=0, 1, \ldots, $N_{t-1}-1$) are calculated, and one of the $k(x_n, x')$ is set to $T_t$, whereby it is guaranteed that $N'_t$ is 1 or more. Where $N'_t$ is equal to $N_{t-1}$, $E_t$ is equal to $D_{t-1}$. In the description below, it is assumed that $N'_t$ is not less than 1 and not more than $N_{t-1}$.

The predetermined point x' need not be the same point in $S_t$, depending upon the observation point $x_n$ (n=0, 1, \ldots, $N_{t-1}-1$), but a different point may be used for each observation point $x_n$. For example, a point obtained by orthographically projecting the observation point $x_n$ onto the low-dimensional search space $S_t$ may be adopted as the predetermined point x'. The predetermined point x' in this case is represented by the formula (6) set forth below. $P_{S_t}$ is a function representing a point obtained by orthographically projecting a point in the D-dimensional space onto the low-dimensional search space $S_t$.

$$x' = P_{S_t}(x_n) \tag{6}$$

The function $P_{S_t}$ is expressed by the formula (7) set forth below. The $I_D$ represents an identity matrix of D rows and D columns. $P_{U_t}$ represents an orthographic projection matrix onto the $R_t$-dimensional linear subspace $U_t$.

$$P_{S_t}(x) = (I_D - P_{U_t}) x_{b_{t-1}} + P_{U_t} x \tag{7}$$

Even in this case, $T_t$ that permits $N'_t$ to be 1 or more can be set. In this case, the set $E_t$ of $N'_t$ observation data extracted from the observation data $D_{t-1}$ by the extraction unit 103 is represented by the formula (8) set forth below. In this case, $E_t$ shown in S307 of FIG. 3 can be replaced with the $E_t$ of the formula (8).

$$\begin{aligned} E_t &= \{(x_n, y_n) \mid k(x_n, x') \geq T_t, n = 0, 1, \ldots, N_{t-1} - 1\} \\ &= \{(x_n, y_n) \mid k(x_n, P_{S_t}(x_n)) \geq T_t, n = 0, 1, \ldots, N_{t-1} - 1\} \end{aligned} \tag{8}$$

As the predetermined point x', the position in the low-dimensional search space $S_t$ need not be defined; it may be defined as a certain point x' in the low-dimensional search space $S_t$. Even in this case, $T_t$ that permits $N'_t$ to be 1 or more can be set. That fact that the similarity $k(x_n, x')$ with respect to the point x' included in the low-dimensional search space $S_t$ is $T_t$ or more is equivalent to the fact that the maximum value of the similarity $k(x_n, x')$ with respect to all the points x' included in the low-dimensional search space $S_t$ is $T_t$ or more, that is, the maximum similarity is $T_t$ or more. Hence, the formula (9) set forth below holds. In this case, $E_t$ shown in S307 of FIG. 3 can be replaced with the $E_t$ of the formula (9). That is, the extraction unit 103 refers to one or more points $x_n$ included in the D-dimensional space represented by one or more parameter vector values included in the observation data $D_{t-1}$ stored in the storage unit 101 and extracts, as extracted data $E_t$, a set of pairs corresponding to one or more points at which a maximum similarity, which is a maximum value of the similarity $k(x_n,x')$ to all points x' included in the low-dimensional search space $S_t$, is a predetermined value $T_t$ or more.

$$E_t = \{(x_n, y_n) \mid \exists x' \in S_t, k(x_n, x') \geq T_t, n = 0, 1, \ldots, N_{t-1} - 1\} = \quad (9)$$
$$\{(x_n, y_n) \mid \max_{x' \in S_t} k(x_n, x') \geq T_t, n = 0, 1, \ldots, N_{t-1} - 1\}$$

$\max_{x' \in S_t} k(x_n, x')$:maximum similarity

Where the kernel function to be adopted is a squared exponential kernel function or an ARD squared exponential kernel function, the formula (10) set forth below holds depending upon the kernel function. In this case, $E_t$ shown in S307 of FIG. 3 can be replaced with the $E_t$ of the formula (10).

$$E_t = \{(x_n, y_n) \mid \exists x' \in S_t, k(x_n, x') \geq T_t, n = 0, 1, \ldots, N_{t-1} - 1\} \quad (10)$$
$$= \{(x_n, y_n) \mid \max_{x' \in S_t} k(x_n, x') \geq T_t, n = 0, 1, \ldots, N_{t-1} - 1\}$$
$$= \{(x_n, y_n) \mid k(x_n, P_{S_t}(x_n)) \geq T_t, n = 0, 1, \ldots, N_{t-1} - 1\}$$

The squared exponential kernel function $k(x_i,x_j)$ for two points $x_i$ and $x_j$ is expressed by the formula (11) set forth below. $\theta_\sigma$ and $\theta_l$ are hyperparameters that are referred to as the signal standard deviation and the length scale, respectively. Each of the values of $\theta_\sigma$ and $\theta_l$ has to be larger than 0.

$$k(x_i, x_j) = \theta_\sigma^2 \exp\left(-\frac{1}{2} \frac{\|x_i - x_j\|^2}{\theta_l^2}\right) \quad (11)$$

From the definition formula shown in the formula (11), the following formula (12) is established.

$$\max_{x' \in S_t} k(x_n, x') = k(x_n, P_{S_t}(x_n)) \quad (12)$$

The ARD squared exponential kernel function $k(x_i,x_j)$ for the two points $x_i$ and $x_j$ is expressed by the formula (13) set forth below. $\theta_l$ is a hyperparameter and represents a D-dimensional length scale vector having a length scale for each coordinate axis direction of the D-dimensional space as an element. •[d] (d=0, 1, . . . , D−1) represents the d-th element of the vector.

$$k(x_i, x_j) = \theta_\sigma^2 \exp\left(-\frac{1}{2} \sum_{d=0}^{D-1} \frac{((x_i)_{[d]} - (x_j)_{[d]})^2}{(\theta_l)_{[d]}^2}\right) \quad (13)$$

From the definition formula shown in the formula (13), the following formula (14) is established.

$$\max_{x' \in S_t} k(x_n, x') = k(x_n, P_{S_t}(x_n)) \quad (14)$$

After S203 is performed, the proposal unit 104 executes the proposal process (S204). In S204 at the time t, the proposal unit 104 utilizes the extracted data $E_t$ received from the extraction unit 103, proposes a point at which the value of the objective function is to be observed next, sends it to the storage unit 101, and outputs it to the outside of the parameter vector value proposal apparatus 100. Since the observation points included in the observation data $D_{t-1}$ stored in the storage unit 101 in S203 at the time t are $x_0, x_1, \ldots, x_{Nt-1-1}$, $N_{t-1}$ is adopted as the index of a point to be observed next, and the point proposed by the proposal unit 104 is represented as $x_{Nt-1}$. This $x_{Nt-1}$ is referred to as a proposal point.

As shown in S308 of FIG. 3, the proposal unit 104 constructs an acquisition function from a surrogate model that expresses the characteristics of an unknown objective function, proposes a point where the value of the acquisition function is largest in the low-dimensional search space $S_t$, and sets that point as a proposal point $x_{Nt-1}$. The proposal point $x_{Nt-1}$ is represented by the formula (15) set forth below. $a_t(x|E_t)$ is an acquisition function defined from a surrogate model based on the extracted data $E_t$.

$$x_{N_{t-1}} = \operatorname*{argmax}_{x \in S_t} a_t(x \mid E_t) \quad (15)$$

For example, a GP regression model, a random forest model or the like is adopted as the surrogate model. As the acquisition function $a_t$, for example, Lower Confidence Bound (LCB), Expected Improvement (EI), Probability of Improvement (PI), Mutual Information (MI), Predictive Entropy Search (PES), Max-value Entropy Search (MES) or the like is adopted.

The point at which the value of the acquisition function is largest in the low-dimensional search space $S_t$ can be obtained, for example, by setting a plurality of points in $S_t$ and selecting a point at which the value of the acquisition function $a_t$ is largest from among those points. Alternatively, such a point can be obtained by using an optimization method, such as the L-BFGS method.

After S204 is performed, the observation apparatus 200 executes the observation process (S205). In S205 at the time t, the observation apparatus 200 acquires a proposal point $x_{Nt-1}$ from the proposal unit 104 via the network or the like, and observes an observation value $y_{Nt-1}$, based on the proposal point $x_{Nt-1}$. The observation value $y_{Nt-1}$ is supplied to the parameter vector value proposal apparatus 100 via the network.

The observation value $y_{Nt-1}$ is an observation value of the objective function f with respect to the proposal point $x_{Nt-1}$. As shown in S309 of FIG. 3, the observation value $y_{Nt-1}$ is acquired by the storage unit 101. The observation value $y_{Nt-1}$ is expressed by the formula (16) set forth below. $\varepsilon_{Nt-1}$ represents a noise component that is included in the observation value $y_{Nt-1}$ at the time t.

$$y_{N_{t-1}} = f(x_{N_{t-1}}) + \varepsilon_{N_{t-1}} \quad (16)$$

After S205 is performed, the storage unit 101 executes the update process (S206). In S206 at the time t, the storage unit 101 stores observation data $D_t$ in which the pair consisting of the observation point $x_{N_{t-1}}$ supplied from the proposal unit 104 and the observation value $y_{N_{t-1}}$ supplied from the observation apparatus 200 are added to $D_{t-1}$. As shown in S310 of FIG. 3, the observation data Dt is represented by the formula (17) set forth below. ∪ represents a union of two sets.

$$D_t = D_{t-1} \cup \{(x_{N_{t-1}}, y_{N_{t-1}})\} \qquad (17)$$

The addition of this pair increases the number of elements in the observation data by one. Therefore, with respect to the number $N_t$ of pairs stored in the storage unit 101 at the time t and the number $N_{t-1}$ of pairs stored in the storage unit 101 at the time t−1, the following formula (18) is established, as shown in S311 of FIG. 3.

$$N_t = N_{t-1} + 1 \qquad (18)$$

After S206 is performed, the control unit 105 executes the determination process (S207). In S207 at the time t, the control unit 105 determines whether or not the processes from S202 to S206 are repeated a predetermined number of times T. Where the time t is less than T (S207: NO), the control unit 105 increments the time t and returns to S202. The processes from S202 to S207 are repeated until the time t reaches T, as in the "for statements" of S303 and S312 in FIG. 3.

Where the time t reaches T (S207: YES), the control unit 105 executes the output process (S208). The time in S208 is T. In S207 at the time T, the control unit 105 selects an observation point corresponding to the smallest observation value in the observation data $D_T$ at the time T and outputs that observation point to an external device of the parameter vector value proposal apparatus 100 as an optimum point. The index $b_T$ of the smallest observation value in the $D_T$ is represented by the following formula (19), as shown in S313 of FIG. 3.

$$b_T = \underset{n=0,1,\ldots,N_T-1}{\mathrm{argmin}} \; y_n \qquad (19)$$

As shown in S314 of FIG. 3, the optimum point to be output to the external device of the parameter vector value proposal apparatus 100 is an observation point $x_{N_t}$ corresponding to the smallest observation value $y_{b_t}$ in the set $D_T$.

After S208 is performed, the parameter optimization process by the parameter optimization system 1 ends.

A description will be given of the advantages of the present embodiment.

As a preparation for this, a description will be given as to how GP regression is utilized in the standard Bayesian optimization method and in the method of Non-Patent Document 1. After the observation data $D_{t-1}$ is utilized and GP regression of the objective function f is performed at a point x, an expected value E of a predicted value is expressed by the formula (20) set forth below. $\bullet^T$ represents a transpose of a vector or a matrix. K is a matrix of $N_{t-1}$ rows and $N_{t-1}$ columns, and its elements $K_{[r,c]}$ (r, c=0, 1, . . . , $N_{t-1}$−1) are expressed as $k(x_r, x_c)$. $\bullet[r,c]$ represents an element of the r-th row and c-th column of the matrix. σ represents a standard deviation of the noise component. I represents an identity matrix of $N_{t-1}$ rows and $N_{t-1}$ columns. $\bullet^{-1}$ represents an inverse matrix of the matrix. $y = (y_0, y_1, \ldots, y_{N_t-1}-1)^T$.

$$E[f(x)|x, D_{t-1}] = (K + \sigma^2 I)^{-1} y \qquad (20)$$

$$k = (k(x, x_0), k(x, x_1), \ldots, k(x, x_{N_{t-1}-1}))^T$$

After the observation data Dt−1 is utilized and the GP regression of the objective function f at the point x is performed, a variance V of a predicted value is represented by the following formula (21).

$$V[f(x)|x, D_{t-1}] = k(x,x) - k^T (K + \sigma^2 I)^{-1} k \qquad (21)$$

For example, where LCB is adopted as an acquisition function $a_t$, $a_t$ is expressed by the formula (22) set forth below. κ is a parameter that determines the balance between exploration and exploitation.

$$a_t(x|D_{t-1}) = -E[f(x)|x, D_{t-1}] + \kappa V[f(x)|x, D_{t-1}] \qquad (22)$$

As described above, in the method of Non-Patent Document 1, the acquisition function used to determine a proposal point is defined based on GP regression. Even where an acquisition function other than LCB is adopted as the acquisition function $a_t$, the acquisition function used to determine a proposal point is defined based on GP regression.

Even in the method of Non-Patent Document 1, the mathematical formulas related to the acquisition function are the same as those of the standard Bayesian optimization method as long as the types of acquisition functions to be adopted are the same. The Bayesian optimization method of Non-Patent Document 1 differs from the standard Bayesian optimization method in that the range in which the acquisition function $a_t$ obtains a maximum point is not the D-dimensional space but the one-dimensional search space.

An expected value E of the predicted value can be transformed as shown in the formula (23) set forth below. $((K+\sigma^2 I)^{-1} y)_{[n]}$ is a constant determined from the observation data $D_{t-1}$, and $k(x, x_n)$ depends on the point x.

$$E[f(x) \mid x, D_{t-1}] = k^T (K + \sigma^2 I)^{-1} y \qquad (23)$$

$$= \sum_{n=0}^{N_{t-1}-1} k(x, x_n) ((K + \sigma^2 I)^{-1} y)_{[n]}$$

If $k(x, x_n)$ shown in formula (23) is interpreted as a weight of the constant $((K+\sigma^2 I)^{-1} y)_{[n]}$, it can be seen that the observation point $x_n$ at which the absolute value of $k(x, x_n)$ is small does not have a high degree of contribution to the expected value E. Since $k(x, x_n)$ is a similarity and does not take a negative value, the contribution of the predicted value to the expected value E is small at the observation point $x_n$ having a low similarity $k(x, x_n)$. Further, at the observation point $x_n$ having a low similarity $k(x, x_n)$, the contribution to the variance V shown in the formula (21) is also small.

In the present embodiment, the points at which the value of the acquisition function have to be calculated are limited to the points in the low-dimensional search space $S_t$. Therefore, an observation point $x_n$ having a low similarity $k(x', x_n)$ to a point x' included in the low-dimensional search space $S_t$ does not much contribute to the expected value E of the predicted value, the variance V of the predicted value, or the acquisition function $a_t$.

The extracted data $E_t$ of the present embodiment is obtained by extracting a pair corresponding to $x_n$ having a similarity $k(x', x_n)$ of $T_t$ or more with respect to a predetermined point x' from the observation data $D_{t-1}$. The extracted data $E_t$ is represented by the following formula (24).

$$E_t = \{(\tilde{x}_n', \tilde{y}_n') | n' = 0, 1, \ldots, N_t'-1\} \qquad (24)$$

$(\tilde{x}_n', \tilde{y}_n'): N_t'$ elements of $E_t, n' = 0, 1, \ldots, N_{t-1}'-1$ Therefore, the extracted data $E_t$ is a set of pairs corresponding to the observation points having a large contribution of the expected value E of the predicted value, the variance V of the predicted value, and the acquisition function $a_t$.

In the present embodiment, the expected value E of the predicted value, the variance V of the predicted value, and the acquisition function $a_t$ are represented by the following formulas (25), (26) and (27), respectively.

$$E[f(x) | x, D_{t-1}] \approx E[f(x) | x, E_t] \quad (25)$$

$$= \sum_{n'=0}^{N'_t - 1} k(x, \tilde{x}_{n'})\left((\tilde{K} + \sigma^2 \tilde{I})^{-1} \tilde{y}\right)_{[n']}$$

$$= \tilde{k}^T (\tilde{K} + \sigma^2 \tilde{I})^{-1} \tilde{y}$$

$$V[f(x) | x, D_{t-1}] \approx V[f(x) | x, E_t] \quad (26)$$

$$= k(x, x) - \tilde{k}^T (\tilde{K} + \sigma^2 \tilde{I})^{-1} \tilde{k}$$

$$a_t(x | D_{t-1}) \approx a_t(x | E_t) \quad (27)$$

$\tilde{K}$ is a matrix of $N_t'$ rows and $N_t'$ columns, $\tilde{K}_{[r,c]} = k(\tilde{x}_r, \tilde{x}_c)$. $\tilde{I}$ is an identity matrix of $N_t'$ rows and $Mt'$ columns.

$$\tilde{y} = (\tilde{y}_0, \tilde{y}_1, \ldots, \tilde{y}_{N'_{t-1}})^T$$

$$\tilde{k} = (k(x, \tilde{x}_0), k(x, \tilde{x}_1), \ldots, k(x, \tilde{x}_{N'_{t-1}}))^T$$

For example, where LCB is adopted as the acquisition function, the acquisition function $a_t$ is expressed by the following formula (28).

$$a_t(x|E_t) = -E[f(x)|x, E_t] + \kappa V[f(x)|x, E_t] \quad (28)$$

Even where an acquisition function other than LCB is adopted, the acquisition function $a_t$ used to determine a proposal point is defined based on the expected value E and the variance V in a prediction period.

As described above, in the present embodiment, the expected value E of the predicted value, the variance V of the predicted value and the acquisition function $a_t$ are approximated using the extracted data $E_t$ including pairs that correspond to the observation points $x_n$ having a high similarity $k(x, x_n)$ and a high degree of contribution. Since the approximation is performed by utilizing such extracted data $E_t$, the accuracy of approximation is high and the deterioration due to the approximation is small.

In the method of Patent Document 1, the expected value E of the predicted value, the variance V of the predicted value, and the acquisition function $a_t$ are respectively approximated by the formulas (29), (30) and (31) set forth below. Here, Ft={$(x_n, y_n)$|dist($S_t, x_n$)≤A, n=0, 1, ..., $N_{t-1}$−1}, dist (S,x) is a function that calculates the distance between space S and point x. "A" represents a threshold value regarding a distance.

$$E[f(x)|x, D_{t-1}] \approx E[f(x)|x, F_t] \quad (29)$$

$$V[f(x)|x, D_{t-1}] \approx V[f(x)|x, F_t] \quad (30)$$

$$a_t(x|D_{t-1}) \approx a_t(x|F_t) \quad (31)$$

where, $F_t\{(x_n, y_n)|\text{dist}(S_t, x_n) \leq A, n=0,1, \ldots, N_{t-1}-1\}$ The short distance dist($S_t, x_n$) between the space $S_t$ and the point $x_n$ and the high similarity $k(x, x_n)$ between the point x ($\in S_t$) and the point $x_n$ do not always match. Therefore, Ft is not limited to data on the pairs corresponding to observation points xn having a high degree of contribution, and the method of Patent Document 1 may undergo certain deterioration due to approximation, and the approximation accuracy is not necessarily high. Therefore, the method of Patent Document 1 does not always have satisfactory search efficiency.

Since the observation data $D_{t-1}$ is used in the method of Non-Patent Document 1, the calculation order of $(K+\sigma^2 I)^{-1}$ depends on the number of elements $N_{t-1}$ of $D_{t-1}$ and is $O(N_{t-1}^3)$. On the other hand, in the present embodiment, the extracted data $E_{t-1}$ is used, so that the calculation order of $(\tilde{K}+\sigma^2 \tilde{I})^{-1}$ depends on the number of elements $N_t'$ of $E_t$ and is $O(N_t'^3)$. From $1 \leq N_t' \leq N_{t-1}$, the calculation cost of an inverse matrix in the present embodiment is equal to or less than that of the method of Non-Patent Document 1. Depending upon the value of $T_t$, $N_t' < N_{t-1}$. In this case, the calculation cost of an inverse matrix in the present embodiment is lower than that of the method of Non-Patent Document 1.

As described above, in the present embodiment, the expected value and variance of a predicted value and an acquisition function are approximated with high accuracy, and the calculation cost of an inverse matrix in GP regression is low. According to this embodiment, therefore, the calculation cost of an inverse matrix in GP regression can be reduced as much as possible without much deterioration in the search efficiency of a parameter vector value.

Even though the present embodiment enables the calculation cost of an inverse matrix in GP regression to be reduced as much as possible without deterioration in the search efficiency of a parameter vector value, the advantages of the present embodiment are not limited to this. In some cases, the search efficiency of parameter optimization can be improved.

FIG. 4 is a diagram illustrating a state in which the value of an objective function is observed at seven observation points in the D-dimensional space of the case where D=2. In the graph 41 on the left side of FIG. 4, the horizontal axis corresponds to the 0th element of a D-dimensional parameter vector, and the vertical axis corresponds to the 1st element. The axis of the depth direction corresponds to the value of an objective function. Each of the seven points represents the position of an observation point in the D-dimensional space. The broken line represents low-dimensional search space $S_t$. The shade of the ellipses represents the value of an unknown objective function f. In this shade, black indicates that the value of an objective function is small, and white indicates that the value of an objective function is large.

In the graph 42 on the right side of FIG. 4, the horizontal axis represents a distance $\|x_n - x'\|$ to a predetermined point $x' (\in S_t)$ at each observation point $x_n$ (n=0, 1, ..., 6), and the vertical axis represents a similarity $k(x_n, x')$ between $x_n$ and $x'$. The solid curve represents a squared exponential kernel function with a small length scale, and the broken-line curve represents a squared exponential kernel function with a large length scale.

As shown in FIG. 4, where the squared exponential kernel function with a large length scale is used, the degrees of similarity at the observation points $x_n$ are relatively uniform, and where the squared exponential kernel function with a small length scale is used, the degrees of similarity depend on the observation points $x_n$ and are significantly different.

Since the objective function f in FIG. 4 takes a small value locally, an observation point $x_n$ located at a position farther from the low-dimensional search space $S_t$ than the local solution is not useful for predicting a value of an objective function for a point in $S_t$. In the example of FIG. 4, therefore, it is preferable that the length scale of the squared exponential kernel function is small.

As described above, as the hyperparameter of a kernel function, a predetermined value is adopted, or a value estimated from observation data or from extracted data described later is adopted. Therefore, an optimum value is not always adopted in correspondence to the shape of an objective function.

Where the length scale is larger than an optimum value, the prediction accuracy of GP regression is low, and the search efficiency of parameter optimization is poor. On the other hand, in the present embodiment, only extracted data $E_t$ of observation data $D_{t-1}$ is utilized for GP regression, and observation points having low degrees of similarity are not used, that is, the degrees of similarity to such observation points are forcibly replaced with 0. Therefore, the behavior of GP regression becomes similar to the behavior of the case where the length scale is reduced and an optimum length scale is adopted. As a result, there is a case where the search efficiency of parameter optimization is improved more where only the extracted data $E_t$ is used than where the observation data $D_{t-1}$ is used.

As described above, in the present embodiment, it may be possible to achieve both improvement in the search efficiency of a parameter vector value and reduction in the calculation cost of an inverse matrix in GP regression. This advantage is not limited to the case where the objective function f has a large number of local solutions. The advantage is achieved where the length scale is large compared to the optimal value.

<Modification 1>

The extraction unit 103 according to modification 1 refers to one or more points in the D-dimensional space represented by one or more parameter vector values included in the observation data stored in the storage unit 101, and extracts, as extracted data, a set of pairs corresponding to one more points at which degrees of similarity to a point included in the low-dimensional search space are within a predetermined percentage in descending order. Modification 1 will be described in detail below.

Observation points $x_n$ (n=0, 1, ..., $N_{t-1}-1$) are rearranged such that degrees of similarity $k(x_n,x')$ to a predetermined point x' are arranged in descending order, and the rearranged observation points are represented by $x''_n$ (n=0, 1, ..., $N_{t-1}-1$) and the corresponding observation values are represented by $y''_n$. The extraction unit 103 may extract extracted data $E_t$ represented by the formula (32) from $D_{t-1}$. It should be noted that $r_t$ represents a percentage and takes a value that is not less than $1/N_{t-1}$ and not more than 1. Where $r_t$ is 1, $E_t$ is equal to $D_{t-1}$. floor(•) is a function with which to obtain the largest integer that is not more than an argument.

$$E_t=\{(x''_n,y''_n)|n=0,1,\ldots,\text{floor}(r_t N_{t-1})-1\} \quad (32)$$

$E_t$ of the present embodiment and $\{(x_n,y_n)|k(x_n,x')\geq T_t, n=0, 1, \ldots, N_{t-1}-1\}$ shown in the present embodiment become equivalent, depending upon how $r_t$ and $T_t$ are set. In this modification, the number of elements $N_t'$ of $E_t$ can be directly controlled by $r_t$, as shown in the following formula (33).

$$N_t'=\text{floor}(r_t N_{t-1}) \quad (33)$$

Since the calculation cost of an inverse matrix of GP regression depends on $N_t'$, this modification is advantageous in that the calculation cost can be controlled.

The calculation cost of an inverse matrix increases sharply as $N_t'$ is large, while the calculation cost of the inverse matrix does not become a practical problem as long as $N_t'$ is small. Therefore, it is preferable to set $r_t$ to 1 while the time t is small and the number of elements $N_{t-1}$ of $D_{t-1}$ is small. If the time t is large and the calculation cost of an inverse matrix becomes too high by making $E_t$ equal to $D_{t-1}$ and making $N_t'$ equal to $N_{t-1}$, then it is preferable to set $r_t$ to be smaller than 1 and set the calculation time to be within a desired time. As a result, the calculation cost of an inverse matrix can be suppressed with almost no deterioration in the search efficiency of parameter optimization.

In the present embodiment, where a predetermined point x' is defined as a certain point in the low-dimensional search space $S_t$, the following formula (34) holds.

$$E_t=\{(x_n,y_n)\,|\,\exists x' \in S_t, k(x_n,x')\geq T_t, n=0,1,\ldots,N_{t-1}-1\} \quad (34)$$
$$=\{(x_n,y_n)\,|\,\max_{x'\in S_t}k(x_n,x')\geq T_t, n=0,1,\ldots,N_{t-1}-1\}$$

In this case, the maximum degrees of similarity $\max k(x_n, x')$ shown in the formula (34) and rearranged in descending order are represented by $x''_n$ (n=0, 1, ..., $N_{t-1}-1$) and the corresponding observation values are represented by $y''_n$. The extraction unit 103 may extract extracted data $E_t$ represented by the formula (35) from $D_{t-1}$.

$$E_t=\{(x''_n,y''_n)|n=0,1,\ldots,\text{floor}(r_t N_{t-1})-1\} \quad (35)$$

$E_t$ of the formula (35) and $E_t$ of the formula (34) are equivalent, depending upon how $r_t$ and $T_t$ are set. In this modification, the number of elements $N_t'$ of $E_t$ can be directly controlled by $r_t$, as shown in the following formula (36).

$$N_t'=\text{floor}(r_t N_{t-1}) \quad (36)$$

Since the calculation cost of an inverse matrix of GP regression depends on $N_t'$, this modification is advantageous in that the calculation cost can be controlled. By controlling $r_t$ as above, the calculation cost of an inverse matrix can be suppressed with almost no deterioration in the search efficiency of parameter optimization.

<Modification 2>

The proposal unit 104 according to modification 2 calculates a similarity between two points in the D-dimensional space, from components of orthogonal complement space of linear subspace accompanying R-dimensional affine subspace, which is low-dimensional search space included in the D-dimensional space. Modification 2 will be described in detail below.

In the present embodiment, extracted data $E_t$ is represented by the following formula (37).

$$E_t=\{(x_n,y_n)|k(x_n,P_{S_t}(x_n))\geq T_t, n=0,1,\ldots,N_{t-1}-1\} \quad (37)$$

For example, where the kernel function is a squared exponential kernel function, the formula (38) set forth below holds from the definition of the function $P_{S_t}$. $(I_D-P_{U_t})$ is an orthographic projection matrix projected onto the orthogonal complement space $U_t^\perp$ of the $R_t$-dimensional linear subspace $U_t$ accompanying $S_t$.

$$k(x_n, P_{S_t}(x_n)) = \theta_\sigma^2 \exp\left(-\frac{1}{2}\frac{\|x_n-P_{S_t}(x_n)\|^2}{\theta_l^2}\right) \quad (38)$$
$$= \theta_\sigma^2 \exp\left(-\frac{1}{2}\frac{\|(I_D-P_{U_t})(x_n-x_{b_{t-1}})\|^2}{\theta_l^2}\right)$$

Any point x in the D-dimensional space is represented by the formula (39) set forth below. Specifically, any point x in the D-dimensional space can be decomposed into a component of the first term on the right side of the formula (39) and a component of the second term on the right side thereof. The former is referred to as the $U_t$ component of the point x, and the latter is referred to as the $U_t^\perp$ component of the point x. $(I_D-P_{Ut})(x_n-x_{bt-1})$ is a $U_t^\perp$ component of the difference vector $(x_n-x_{bt-1})$ between the observation point $x_n$ and the best observation point $x_{bt-1}$, and does not have $U_t$ component.

$$x = P_{Ut}x + (I_D - P_{Ut})x \qquad (39)$$

Where all of $R_t$ vectors along the $R_t$ coordinate axes in the D-dimensional space are elements of an $R_t$-dimensional linear subspace $U_t$, $(I_D-P_{Ut})$ is a diagonal matrix. Of the diagonal components of the diagonal matrix, $R_t$ components corresponding to $R_t$ coordinate axes are 0, and the remaining $(D-R_t)$ components are 1. The $R_t$ components correspond to $U_t$ components, and the remaining $(D-R_t)$ components correspond to $U_t^\perp$ components. Therefore, $(I_D-P_{Ut})(x_n-x_{bt-1})$ can be calculated by referring to only the $(D-R_t)$ components corresponding to the $U_t^\perp$ components of $x_n$ and $x_{bt-1}$.

This property is utilized in the present modification, and $U_t$ is changed in accordance with the time t under the constraint that all $R_t$ vectors along the $R_t$ coordinate axes in the D-dimensional space are elements of the $R_t$-dimensional linear subspace $U_t$, $k(x_n, P_{St}(x_n))$ is calculated by referring to only the $(D-R_t)$ components corresponding to the $U_t^\perp$ components, and extracted data $E_t$ is extracted. Since the values of the $U_t$ components need not be referred to, the calculation cost can be reduced.

<Modification 3>

In the present embodiment, as shown in the formula (40) set forth below, the extraction unit 103 extracts extracted data $E_t$ on the condition that the similarity $k(x_n, x')$ is a predetermined value Tt or more.

$$E_t = \{(x_n, y_n) | k(x_n, x') \geq T_t, n=0, 1, \ldots, N_{t-1}-1\} \qquad (40)$$

The extraction unit 103 according to modification 3 extracts the extracted data $E_t$, based on another condition. Where the kernel function is a squared exponential kernel function, the fact that $k(x_n, x') \geq T_t$ holds is equivalent to the fact that the following formula (41) holds.

$$\theta_\sigma^2 \exp\left(-\frac{1}{2}\frac{\|x_n - x'\|^2}{\theta_l^2}\right) \geq T_t \qquad (41)$$

Assuming that $T_t \leq \theta \sigma^2$, the fact that $k(x_n, x') \geq Tt$ holds is equivalent to the fact that the following formula (42) holds for the distance $\|x_n - x'\|$.

$$\|x_n - x'\| \leq T'_t \theta_l \qquad (42)$$

$$T'_t = \sqrt{-2\log_e \frac{T_t}{\theta_\sigma^2}}$$

The extraction unit 103 according to modification 3 extracts extracted data $E_t$ on the condition that the distance $\|x_n - x'\|$ is $T'_t$-fold of the length scale θl or less. Therefore, the following formula (43) holds for $E_t$.

$$E_t = \{(x_n, y_n) | \|x_n - x'\| \leq T'_t \theta_l, n=0, 1, \ldots, N_{t-1}-1\} \qquad (43)$$

The extracted data $E_t$ of modification 3 is the same extracted data as extracted on the condition that the similarity $k(x_n, x')$ is equal to or higher than a predetermined value $T_t$. Therefore, advantages similar to those of the present embodiment can be obtained.

From the definition of $T'_t$ shown in the formula (42), the user is only required to determine $T_t$ as $T'_t$, and an adaptive value corresponding to the hyperparameter $\theta_\sigma$ of the kernel function is automatically set. The threshold value $T'_t \theta_l$ for the distance $\|x_n - x'\|$ is an adaptive value in correspondence to the hyperparameter $\theta_l$ of the kernel function. Therefore, the threshold value $T'_t \theta_l$ is adaptively set for the distance $\|x_n - x'\|$ in accordance with the hyperparameters $\theta_l$ and $\theta_\sigma$ of the kernel function.

$T'_t$ is not limited to that shown in the formula (42). In this case, there is no guarantee that the extracted data is the same as that of the present embodiment, and $T'_t$ does not depend on the signal standard deviation $\theta_\sigma$. In this case, the calculation of logarithm and square root is unnecessary, and the calculation cost is reduced, accordingly. Even in this case, a set of pairs having a high similarity $k(x_n, x')$ are extracted as extracted data $E_t$.

Where $x' = P_{St}(x_n)$, $U_t$ is changed in accordance with the time t under the constraint that all $R_t$ vectors along the $R_t$ coordinate axes in the D-dimensional space are elements of the $R_t$-dimensional linear subspace $U_t$, and $\|x_n - x'\|$ may be calculated by referring to only the $(D-R_t)$ components corresponding to the $U_t^\perp$ components. Since the values of the $U_t$ components need not be referred to, the calculation cost can be reduced.

Modification 3 was described referring to the case where the kernel function is a squared exponential kernel function. Even if the kernel function is not a squared exponential kernel function, it is only required to have a length scale as a hyperparameter. In this case, the extraction unit 103 may refer to observation points $\{x_n | n=0, 1, \ldots, N_{t-1}-1\}$ included in the observation data $D_{t-1}$ stored in the storage unit 101, and extract, as extracted data $E_t$, a set of pairs corresponding to one or more observation points at which the distance $\|x_n - x'\|$ to a predetermined point x' included in the low-dimensional search space $S_t$ is a coefficient multiple of the length scale θl or less. In this case, there is no guarantee that the extracted data is the same as that of the present embodiment, but a set of pairs corresponding to the observation points $x_n$ at which degrees of similarity $k(x_n, x')$ are high are extracted as the extracted data $E_t$.

<Modification 4>

Where the kernel function has a length scale as a hyperparameter, the extraction unit 103 according to modification 4 refers to one or more points in the D-dimensional space represented by one or more parameter vector values included in the observation data stored in the storage unit 101, and extracts, as extracted data, a set of pairs corresponding to one or more points at which all D distances in the coordinate axis directions of the D-dimensional space to a point included in the low-dimensional search space are a coefficient multiple of the length scale or less. Specifically, the extraction unit 103 may extract extracted data $E_t$ on the basis that the absolute value of the d-th component difference between the point $x_n$ and the point x' is $T_t''$-fold of the length scale $\theta_l$ or less for all values of d (=0, 1, ..., D−1). It should be noted that $T_t''$ is a coefficient set by the user. In this case, $E_t$ is expressed by the following formula (44).

$$E_t = \{(x_n, y_n) | \forall d \in \{0, 1, \ldots, D-1\} \cdot |(x_n)_{[d]} - (x')_{[d]}| \leq T''_t \theta_l, n=0, 1, \ldots, N_{t-1}-1\} \qquad (44)$$

As can be seen from the formula (44), for the distance $|(x_n)_{[d]} - (x')_{[d]}|$ in each coordinate axis direction d (=0, 1, ..., D−1) in the D-dimensional space, an adaptive threshold is set in accordance with the hyperparameters of the kernel function. Modification 4 is not equivalent to modification 3 but is an approximation thereto. Therefore, advantages similar to those of modification 3 can be obtained.

Where $x'=P_{S_t}(x_n)$, $U_t$ is changed in accordance with the time t under the constraint that all $R_t$ vectors along the $R_t$ coordinate axes in the D-dimensional space are elements of the $R_t$-dimensional linear subspace $U_t$, and extracted data $E_t$ may be extracted on the basis that the absolute value of the d-th component difference between the point $x_n$ and the point x' is than $T_t$"-fold of the length scale $\theta_l$ or less for all (D–$R_t$) values of d corresponding to the $U_t^\perp$ components. Since the values of the $U_t$ components need not be referred to, the calculation cost can be reduced.

<Modification 5>

Where a kernel function for calculating a similarity has a length scale vector as a hyperparameter, the extraction unit 103 according to modification 5 refers to one or more points in the D-dimensional space represented by one or more parameter vector values included in the observation data stored in the storage unit 101 and extracts, as extracted data, a set of pairs corresponding to one or more points at which the square of a normalized Euclidean distance to a point included in the low-dimensional search space is a predetermined value or less. In the calculation of the square of the normalized Euclidean distance, the extraction unit 103 adopts the value of each element of the length scale vector as the standard deviation corresponding to each coordinate axis direction of the D-dimensional space. Modification 5 will be described in detail below.

Where the kernel function is an ARD squared exponential kernel function, the fact that $k(x_n,x') \geq T_t$ holds is equivalent to the fact that the following formula (45) holds.

$$\theta_\sigma^2 \exp\left(-\frac{1}{2}\sum_{d=0}^{D-1}\frac{((x_n)_{[d]} - (x')_{[d]})^2}{(\theta_l)_{[d]}^2}\right) \geq T_t \quad (45)$$

Further, where $T_t'''$ is defined by the formula (46) set forth below, the establishment of the formula (45) is equivalent to the establishment of the formula (47) set forth below.

$$T_t''' = -2\log_e \frac{T_t}{\theta_\sigma^2} \quad (46)$$

$$\sum_{d=0}^{D-1}\frac{((x_n)_{[d]} - (x')_{[d]})^2}{(\theta_l)_{[d]}^2} \leq T_t''' \quad (47)$$

From the definition of the formula (46), the user is only required to determine $T_t$, and an adaptive threshold value $T_t'''$ corresponding to the hyperparameter $\theta_\sigma$ of the kernel function is automatically set.

Where the kernel function is an ARD squared exponential kernel function, the extraction unit 103 may extract the extracted data $E_t$ on the basis that the square of the normalized Euclidean distance between the point $x_n$ and the point x' is $T_t'''$ or less. In the calculation of the square of the normalized Euclidean distance, the value of each element of the D-dimensional length scale vector $\theta_l$ is adopted as the standard deviation of each dimension. In this case, the following formula (48) holds for $E_t$.

$$E_t = \left\{(x_n, y_n) \,\bigg|\, \sum_{d=0}^{D-1}\frac{((x_n)_{[d]} - (x')_{[d]})^2}{(\theta_l)_{[d]}^2} \leq T_t''', n = 0, 1, \ldots, N_{t-1} - 1\right\} \quad (48)$$

$T_t'''$ is not limited to that shown in the formula (46). In this case, there is no guarantee that the extracted data is the same as that of the first embodiment, and $T_t'''$ does not depend on the signal standard deviation $\theta_\sigma$. In this case, the calculation of logarithm is unnecessary, and the calculation cost is reduced, accordingly. Even in this case, a set of pairs having a high similarity $k(x_n,x')$ are extracted as extracted data $E_t$.

Where $x'=P_{S_t}(x_n)$, $U_t$ is changed in accordance with the time t under the constraint that all $R_t$ vectors along the $R_t$ coordinate axes in the D-dimensional space are elements of the $R_t$-dimensional linear subspace $U_t$, and a square of a normalized Euclidean distance may be calculated by referring to only the (D–$R_t$) components corresponding to the $U_t^\perp$ components. Since the values of the $U_t$ components need not be referred to, the calculation cost can be reduced.

The present modification was described referring to the case where the kernel function is an ARD squared exponential kernel function. Even where the kernel function is not an ARD squared exponential kernel function, it is only required to have a D-dimensional length scale as a hyperparameter. In this case, the extraction unit 103 may refer to observation points $\{x_n|n=0, 1, \ldots, N_{t-1}-1)\}$ included in the observation data $D_{t-1}$ stored in the storage unit 101, and extract, as extracted data $E_t$, a set of pairs corresponding to one or more observation points at which the square of the normalized Euclidean distance to a predetermined point x' included in the low-dimensional search space $S_t$ is equal to a predetermined value or less. In this case, there is no guarantee that the extracted data is the same as that of the first embodiment, but a set of pairs corresponding to the observation points $x_n$ at which the similarity $k(x_n,x')$ is high are extracted as the extracted data $E_t$.

<Modification 6>

Where the kernel function for calculating a similarity has a length scale vector as a hyperparameter, the extraction unit 103 according to modification 6 refers to one or more points in the D-dimensional space represented by one or more parameter vector values included in the observation data stored in the storage unit 101, and extracts, as extracted data, a set of pairs corresponding to one or more points at which all D distances in the coordinate axis directions of the D-dimensional space with respect to a point included in the low-dimensional search space are a coefficient multiple of the corresponding element of the length scale vector or less. Specifically, where the kernel function has a D-dimensional length scale vector as a hyperparameter, the extraction unit 103 may extract extracted data $E_t$ on the condition that the absolute value of the d-th component difference between the point $x_n$ and the point x' is $T_t''''$-fold of the d-th element of the D-dimensional length scale vector $\theta_l$ or less for all values of d (=0, 1, . . . , D–1). It should be noted that $T_t''''$ is a coefficient set by the user. In this case, $E_t$ is expressed by the following formula (49).

$$E_t = \{(x_n, y_n) | ^\forall d \in \{0,1, \ldots, D-1\} \cdot |(x_n)_{[d]} - (x')_{[d]}| \leq T_t''''$$
$$(\theta_l)_{[d]}, n=0,1,\ldots,N_{t-1}-1\} \quad (49)$$

As can be seen from the formula (49), for the distance $|(x_n)_{[d]}-(x')_{[d]}|$ in each coordinate axis direction d (=0, 1, . . . , D–1) in the D-dimensional space, an adaptive threshold value can be set in accordance with the hyperparameter of the kernel function. This is not equivalent to modification 5 but is an approximation thereto. Therefore, advantages similar to those of modification 5 can be obtained.

Where $x'=P_{S_t}(x_n)$, $U_t$ is changed in accordance with the time t under the constraint that all $R_t$ vectors along the $R_t$ coordinate axes in the D-dimensional space are elements of the $R_t$-dimensional linear subspace $U_t$, and extracted data $E_t$ may be extracted on the basis that the absolute value of the d-th component difference between the point $x_n$ and the point x' is $T_t''''$-fold of the d-th element of the length scale vector $\theta_l$ or less for all (D–$R_t$) values corresponding to the $U_t^\perp$ components. Since the values of the $U_t$ components need not be referred to, the calculation cost can be reduced.

<Modification 7>

Where the kernel function is a squared exponential kernel function, observation points $x_n$ (n=0, 1, . . . , $N_{t-1}$–1) are rearranged such that distances of $\|x_n-x'\|$ to a predetermined point x' are arranged in ascending order, and the rearranged observation points are represented by $x''_n$ (n=0, 1, . . . , $N_{t-1}$–1) and the corresponding observation values are represented by $y''_n$. The extraction unit 103 may extract extracted data $E_t$ represented by the formula (50) from $D_{t-1}$. It should be noted that $r_t$ represents a percentage and takes a value that not less than $1/N_{t-1}$ and not more than 1, as in modification 1. Where $r_t$ is 1, $E_t$ is equal to $D_{t-1}$. floor(•) is a function for calculating the largest integer that is not more than an argument.

$$E_t=\{(x''_n,y''_n)|n=0,1,\ldots,\text{floor}(r_t N_{t-1})-1\} \quad (50)$$

$E_t$ of the present modification and $E_t$ of modification 3 are equivalent, depending upon how $r_t$ and $T_t'$ are set. The present modification differs from modification 5 in that the number of elements $N_t'$ of $E_t$ can be directly controlled by $r_t$, as shown in the following formula (51).

$$N'_t=\text{floor}(r_t N_{t-1}) \quad (51)$$

Since the calculation cost of an inverse matrix of GP regression depends on $N_t'$, the present modification is advantageous in that the calculation cost can be controlled.

The calculation cost of an inverse matrix increases sharply as $N_t'$ is large, while the calculation cost of the inverse matrix does not become a practical problem as long as $N_t'$ is small. Therefore, it is preferable to set $r_t$ to 1 while the time t is small and the number of elements $N_{t-1}$ of $D_{t-1}$ is small. If the time t is large and the calculation cost of an inverse matrix becomes too high by making $E_t$ equal to $D_{t-1}$ and making $N_t'$ equal to $N_{t-1}$, it is preferable to set $r_t$ to be smaller than 1 and set the calculation time to be within a desired time. As a result, the calculation cost of an inverse matrix can be suppressed with almost no deterioration in the search efficiency of parameter optimization.

Where $x'=P_{S_t}(x_n)$, $U_t$ is changed in accordance with the time t under the constraint that all $R_t$ vectors along the $R_t$ coordinate axes in the D-dimensional space are elements of the $R_t$-dimensional linear subspace $U_t$, and a square of a normalized Euclidean distance may be calculated by referring to only the (D–$R_t$) components corresponding to the $U_t^\perp$ components. Since the values of the $U_t$ components need not be referred to, the calculation cost can be reduced.

The present modification was described referring to the case where the kernel function is a squared exponential kernel function. Even if the kernel function is not a squared exponential kernel function, it is only required to have a length scale as a hyperparameter. In this case, the extraction unit 103 may refer to observation points $\{x_n|n=0, 1, \ldots, N_{t-1}-1\}$ included in the observation data $D_{t-1}$ stored in the storage unit 101, and extract, as extracted data $E_t$, a set of pairs corresponding to observation points at which the distances $\|x_n-x'\|$ to a predetermined point x' included in the low-dimensional search space $S_t$ are within a predetermined percentage in ascending order. Even in this case, a set of pairs corresponding to observation points $x_n$ at which the similarity $k(x_n,x')$ is high are extracted as extracted data $E_t$.

<Modification 8>

Where a kernel function for calculating a similarity has a length scale vector as a hyperparameter, the extraction unit 103 according to modification 8 refers to one or more points in the D-dimensional space represented by one or more parameter vector values included in the observation data stored in the storage unit 101 and extracts, as extracted data, a set of pairs corresponding to points at which the squares of normalized Euclidean distances to a point included in the low-dimensional search space are within a predetermined percentage in ascending order. In the calculation of the square of the normalized Euclidean distance, the extraction unit 103 adopts the value of each element of the length scale vector as the standard deviation corresponding to each coordinate axis direction of the D-dimensional space.

Where the kernel function is an ARD squared exponential kernel function, the observation points $x_n$ (n=0, 1, . . . , $N_{t-1}$–1) are rearranged such that the squares of the normalized Euclidean distances to a predetermined point x' are arranged in ascending order, and the rearranged observation points are represented by $x^*_n$ (n=0, 1, . . . , $N_{t-1}$–1) and the corresponding observation values are represented by $y^*_n$. In the calculation of the squares of the normalized Euclidean distances, the value of each element of the D-dimensional length scale vector $\theta l$ is adopted as a standard deviation corresponding to each coordinate axis direction of the D-dimensional space. Therefore, the square of the normalized Euclidean distance of an observation point $X_n$ to the predetermined point x' is expressed by the following formula (52).

$$\sum_{d=0}^{D-1} \frac{((x_n)_{[d]} - (x')_{[d]})^2}{(\theta_l)^2_{[d]}} \quad (52)$$

The extraction unit 103 may extract extracted data $E_t$ expressed by the formula (53) from $D_{t-1}$. It should be noted that $r_t$ represents a percentage and takes a value that is not less than $1/N_{t-1}$ and not more than 1, as in modification 1. Where $r_t$ is 1, $E_t$ is equal to $D_{t-1}$. floor(•) is a function for calculating the largest integer that is not more than an argument.

$$E_t=\{(x^*_n,y^*_n)|n=0,1,\ldots,\text{floor}(r_t N_{t-1})-1\} \quad (53)$$

$E_t$ of the present modification and $E_t$ of modification 5 are equivalent, depending upon how $r_t$ and $T_t'''$ are set. The present modification differs from modification 5 in that the number of elements $N_t'$ of $E_t$ can be directly controlled by $r_t$, as shown in the following formula (54).

$$N'_t=\text{floor}(r_t N_{t-1}) \quad (54)$$

Since the calculation cost of an inverse matrix of GP regression depends on $N_t'$, the present modification is advantageous in that the calculation cost can be controlled.

The calculation cost of an inverse matrix increases sharply as $N_t'$ is high, while the calculation cost of the inverse matrix does not become a practical problem as long as $N_t'$ is small. Therefore, it is preferable to set $r_t$ to 1 while the time t is small and the number of elements $N_{t-1}$ of $D_{t-1}$ is small. If the time t is large and the calculation cost of an inverse matrix becomes too high by making $E_t$ equal to $D_{t-1}$ and making $N_t'$ equal to $N_{t-1}$, it is preferable to set $r_t$ to be smaller than 1 and set the calculation time to be within a desired time. As a result, the calculation cost of an inverse matrix can be suppressed with almost no deterioration in the search efficiency of parameter optimization.

Where $x'=P_{St}(x_n)$, $U_t$ is changed in accordance with the time t under the constraint that all $R_t$ vectors along the $R_t$ coordinate axes in the D-dimensional space are elements of the $R_t$-dimensional linear subspace $U_t$, and a square of a normalized Euclidean distance may be calculated by referring to only the (D–$R_t$) components corresponding to the $U_t^\perp$ components. Since the values of the $U_t$ components need not be referred to, the calculation cost can be reduced.

The present modification illustrates the case where the kernel function is an ARD squared exponential kernel function. Even if the kernel function is not an ARD squared exponential kernel function, it is only required to have a length scale as a hyperparameter. In this case, the extraction unit 103 may refer to observation points $\{x_n|n=0, 1, \ldots, N_{t-1}-1\}$ included in the observation data $D_{t-1}$ stored in the storage unit 101, and extract, as extracted data $E_t$, a set of pairs corresponding to observation points at which the squares of the normalized Euclidean distances to the predetermined point x' included in the low-dimensional search space $S_t$ are within a predetermined percentage in ascending order. Even in this case, a set of pairs corresponding to observation points $x_n$ at which the high degrees of similarity $k(x_n,x')$ are high are extracted as extracted data $E_t$.

<Modification 9>

The extraction unit 103 according to the present embodiment extracts extracted data $E_t$ from observation data $D_{t-1}$ at the time t in S203. Depending upon the kernel function used for this extraction, there is a hyperparameter. If the extraction of the extracted data $E_t$ depends on the hyperparameter of a kernel function, it is necessary to determine the hyperparameter in advance. As the hyperparameter, a length scale or a vector of the length scale is assumed.

Where the adopted kernel function has a hyperparameter, the value of this hyperparameter should be determined in advance. The value may be a constant or may be changed in accordance with the time t. Where the value is a constant, it is preferable that the extraction unit 103 stores the hyperparameter value.

Where the hyperparameter of the kernel function is changed in accordance with the time t, the extraction unit 103 may have to estimate the hyperparameter value from observation data $D_{t-1}$ or extracted data $E_t$ at the time t in S203 only for the extraction of $E_t$. If this is done, the calculation cost increases, accordingly. Where the method of Non-Patent Document 1 is to be compared, it is preferable that the calculation cost should be as low as possible because the method of Non-Patent Document 1 does not include the process of extracting extracted data $E_t$.

FIG. 5 is a diagram showing a functional configuration example of a parameter optimization system 5 according to modification 9. As shown in FIG. 5, in a parameter vector value proposal apparatus 500 according to modification 9, the storage unit 101 stores hyperparameters as well. In connection with the processes of modification 9, a description will be given of only modified points. In the description below, structural elements having substantially the same functions as the present embodiment will be denoted by the same reference symbols, and a repetitive description will be given only where necessary.

In S203 where the time t is 1, the extraction unit 103 estimates a hyperparameter value from the observation data $D_0$, using an arbitrary existing method as the hyperparameter estimation method. Extracted data $E_t$ is extracted using the estimated hyperparameter value.

In S204 at the time t, the proposal unit 104 estimates a hyperparameter value from the extracted data $E_t$. As the hyperparameter estimation method, any existing method can be used. The estimated hyperparameter value is supplied to the storage unit 101. The storage unit 101 stores the received hyperparameter value. The estimated hyperparameter value is also reflected in the definition of the acquisition function $a_t$ used for determining proposal points.

In S203 where the time t is 2 or thereafter, the extraction unit 103 acquires the hyperparameter value from the storage unit 101. The hyperparameter value to be acquired is the hyperparameter value estimated by the proposal unit 104 at the time (t–1). The extraction unit 103 extracts extracted data $E_t$ by using the hyperparameter value acquired by the extraction unit 103.

According to this modification, the extraction unit 103 extracts extracted data $E_t$ by utilizing the hyperparameter value which the proposal unit 104 estimates at an immediately preceding time, so that the hyperparameter value does not have to be estimated by the extraction unit 103.

<Modification 10>

FIG. 6 is a diagram showing a pseudo program code which is according to modification 10 and corresponds to the parameter optimization process shown in FIG. 2. In the description below, reference will be made only to how the pseudo program code differs from that shown in FIG. 3.

S601 is similar to S301, and S602 is similar to S302.

S603 corresponds to t=1 shown in the "for statement" of S303. In FIG. 3, the time t is incremented by the "for statement" of S303, whereas in FIG. 6, the time t is incremented in S616 described later.

S604 is a "for statement" not shown in FIG. 3. In this "for statement", the "for statement" of S605 described later is repeated J times. The maximum value of the time t is determined by J and by G and L described later.

S605 is a "for statement" not shown in FIG. 3. In this "for statement", the processes from S606 to S617 are repeated G times.

The processing content of S606 is similar to that of S304, but the processing timing is different. In S304, processing is performed each time the time advances by 1, whereas in S606 processing is performed each time the time advances by L (described later) since this step is outside the "for statement" of S610 (described later) including S616 (described later) in which the time t is incremented.

The processing content of S607 is similar to that of S305, but the processing timing is different. In S305, processing is performed each time the time advances by 1, whereas in S607 processing is performed each time the time advances by L (described later) since this step is outside the "for statement" of S610 (described later) including S616 (described later) in which the time t is incremented.

The processing content of S608 is similar to that of S306, but the processing timing is different. In S306, processing is performed each time the time advances by 1, whereas in S608 processing is performed each time the time advances by L (described later) since this step is outside the "for statement" of S610 (described later) including S616 (described later) in which the time t is incremented.

The processing content of S609 is similar to that of S307, but the processing timing is different. In S307, processing is performed each time the time advances by 1, whereas in S609 processing is performed each time the time advances by L (described later) since this step is outside the "for statement" of S610 (described later) including S616 (described later) in which the time t is incremented.

S610 is a "for statement" not shown in FIG. 3. In this "for statement", the processes from S611 to S616 are repeated L times. Since the processes from S606 to S608 for updating the low-dimensional search space $S_t$ are outside this "for statement", $S_t$ does not change in this "for statement".

The processing content of S611 is similar to that of S308. The processing timing is also similar in that the time advances by one.

The processing content of S612 is similar to that of S309. The processing timing is also similar in that the time advances by one.

The processing content of S613 is similar to that of S310. The processing timing is also similar in that the time advances by one.

In S614, the extraction unit 103 generates extracted data $E_t$ by integrating extracted data $E_{t-1}$ and pairs $(x_{N_{t-1}}, y_{N_{t-1}})$. Since $x_{N_{t-1}}$ is a proposal point which the proposal unit 104 determines in the low-dimensional search space $S_t$, it is an element of $S_t$. Therefore, the similarity $k(x_{N_{t-1}}, x')$ between the proposal point $x_{N_{t-1}}$ and the predetermined point x' is high. For example, where the kernel function is a squared exponential kernel function and $x'=P_{S_t}(x_n)$, the formula (55) set forth below holds. This is the maximum value that the similarity can take under these conditions. Therefore, even if the process of S307 is performed at the same timing as S614, the same extracted data $E_t$ as obtained in the process of S614 is generated. Therefore, S614 is equivalent to S307, depending upon the conditions.

$$k(x_{N_{t-1}}, x') = k(x_{N_{t-1}}, P_{S_t}(x_{N_{t-1}})) \quad (55)$$
$$= k(x_{N_{t-1}}, x_{N_{t-1}})$$
$$= \theta_\sigma^2 \exp\left(-\frac{1}{2}\frac{\|x_{N_{t-1}} - x_{N_{t-1}}\|^2}{\theta_l^2}\right)$$
$$= \theta_\sigma^2$$

The processing content of S615 is similar to that of S311. The processing timing is also similar in that the time advances by one. S616 corresponds to the increment of the time t shown in the "for statement" of S303.

S617 is a "for statement" not shown in FIG. 3, and corresponds to the above-mentioned S610. S618 is a "for statement" not shown in FIG. 3, and corresponds to the above-mentioned S605. S619 is a "for statement" not shown in FIG. 3, and corresponds to the above-mentioned S604.

In S620, T is defined based on the number of times the time t is incremented in S616. This T corresponds to the T of S303.

S621 is similar to S313. S622 is similar to S314.

In the pseudo code of FIG. 6, the processes from S606 to S608, which are related to the low-dimensional search space $S_t$, are not executed until the time advances by L. In the processes performed by this pseudo code, $S_t$ is fixed during that time, and proposal, observation and updating are repeated in the state in which $S_t$ is fixed.

In S607, $U_t$ may be changed and set in accordance with g. For example, $R_t$ may be set to 1 regardless of the time t to establish G=D, g may be associated with each coordinate axis direction of the D-dimensional space, and $U_t$ may be set as representing the one-dimensional linear subspace corresponding to g.

$U_t$ may be set by another rule. An example will be described. G sets having integers 0 to D−1 as elements are defined and represented by $h_g$ (g=0, 1, . . . , G−1). The number of elements of $h_g$ is 1 or more. For example, let it be assumed that $h_0=\{0,1\}$, $h_1=\{2,3,4,5\}$, $h_2=\{6\}$, . . . , $h_{G-1}=\{D-2,D-1\}$. In correspondence with g of S605, it is preferable to set $U_t$ as an $R_t$-dimensional linear subspace that has only the direction vector of each coordinate axis corresponding to an element of $h_g$ in the D-dimensional space as the basis vector. In this case, $R_t=\#(h_g)$. It should be noted that #(•) is a function for calculating the number of elements. As a result, the basis vector of $U_t$ changes in accordance with g. That is, the dimension and direction of $U_t$ change in accordance with g. In this example, $h_g$(g=0, 1, . . . , G−1) can be changed in various manners. An example in which $R_t$ is set to 1 regardless of the time t, G and D are made equal to each other, g is made to correspond to each coordinate axis direction of the D-dimensional space, and the one-dimensional linear subspace corresponding to g is $U_t$ corresponds to the case where $h_0=\{0\}$, $h_1=\{1\}$, $h_{G-1}=\{D-1\}$.

The number of elements of each $h_g$ may be made constant regardless of j, or may be changed in accordance with j. Where the number of elements of each $h_g$ is changed in accordance with j, the number may be changed randomly or may be changed according to a predetermined rule. The element of each $h_g$ may be made constant regardless of j, or may be changed in accordance with j. Where the element of each $h_g$ is changed in accordance with j, it may be changed randomly or may be changed according to a predetermined rule.

$U_t$ may be set by still another rule. An example will be described. G sets having D-dimensional vectors as elements are defined, and these sets are represented by $u_g$(g=0, 1, . . . , G−1). The number of elements of $u_g$ is 1 or more. For example, let it be assumed that $u_0=\{v_{0,0}, v_{0,1}\}$, $u_1=\{v_{1,0}, v_{1,1}, v_{1,2}, v_{1,3}\}$, $u_2=\{v_{2,0}\}$, . . . , $u_{G-1}=\{v_{G-1,0}, v_{G-1,1}\}$. In correspondence with g of S605, it is preferable to set $U_t$ as the $R_t$-dimensional linear subspace that has only a D-dimensional vector, which is an element of $u_g$, as the basis vector. In this case, $R_t=\#(u_g)$. As a result, the basis vector of $U_t$ changes in accordance with g. $U_t$ in this case is not necessarily along the coordinate axis direction of the D-dimensional space.

The number of elements of each $u_g$ may be made constant regardless of j, or may be changed in accordance with j. Where the number of elements of each $u_g$ is changed in accordance with j, the number may be changed randomly or may be changed according to a predetermined rule. The elements of each $u_g$ may be made constant regardless of j, or may be changed in accordance with j. Where the elements of each $u_g$ are changed in accordance with j, they may be changed randomly or may be changed according to a predetermined rule.

By setting the $U_t$ of the $R_t$ (<D) dimension in S607, the dimension of $S_t$ also becomes an $R_t$ dimension smaller than D, so that the search efficiency of parameter optimization is improved.

The pseudo code shown in FIG. 6 includes three "for statements", but as in FIG. 3, the "for statements" may be limited those related to the time t and can be transformed into a pseudo code whose processing content is equivalent to that shown in FIG. 6. In the modified pseudo code, j, g, and l shown in FIG. 6 have to be incremented. Further, g and l have to be reset to 0 when they have incremented and reached G−1 and L−1, respectively. The processing flow of the transformed pseudo code corresponds to that shown in FIG. 2. Therefore, the method of controlling $U_t$ based on $h_g$ or $u_g$ can also be applied to the present embodiment. Since the present modification corresponds to FIG. 2, it has advantages similar to those of the present embodiment.

<Modification 11>

The extraction unit 103 according to modification 11 extracts extracted data from observation data, based on the cumulative contribution ratio regarding degrees of similarity. Modification 11 will be described in detail below.

As in modification 1, observation points $x_n$ (n=0, 1, ..., $N_{t-1}-1$) are rearranged such that degrees of similarity $k(x_n, x')$ to a predetermined point x' are arranged in descending order, and the rearranged observation points are represented by $x''_n$ (n=0, 1, ..., $N_{t-1}-1$) and the corresponding observation values are represented by $y''_n$. As shown in the formula (56) set forth below, the ratio of a cumulative similarity to the sum of degrees of similarity will be referred to as a cumulative contribution ratio regarding degrees of similarity.

$$\text{Cumulative contribution ratio}: \frac{\sum_{n=0}^{N-1} k(x''_n, x')}{\sum_{n=0}^{N_{t-1}-1} k(x_n, x')} \quad (56)$$

$$\text{Sum of degrees of similarity}: \sum_{n=0}^{N_{t-1}-1} k(x_n, x')$$

$$\text{Cumulative similarity}: \sum_{n=0}^{N-1} k(x''_n, x')$$

The extraction unit 103 may obtain a minimum N at which the cumulative contribution ratio becomes more than a predetermined value, and extract extracted data $E_t$ represented by the formula (57) from $D_{t-1}$.

$$E_t = \{(x''_n, y''_n) | n=0, 1, \ldots, N-1\} \quad (57)$$

The extraction of $E_t$ according to the formula (57) is equivalent to the extraction of $E_t$ according to the formula (5) in which $T_t$ satisfying $k(x''_{N-1}, x') \geq T_t > k(x''_N, x')$ is set. In the present embodiment, $T_t$ that satisfying $k(x''_{N-1}, x') \geq T_t > k(x''_N, x')$ may be set. Therefore, the advantages of the present modification are similar to those of the present embodiment. In the present modification or in the present embodiment in which $T_t$ satisfying $k(x''_{N-1}, x') \geq T_t > k(x''_N, x')$ is set, the approximation of the formula (23) to the formula (25) is applicable to the case where the cumulative contribution ratio regarding degrees of similarity is used, so that the approximation accuracy is highly explanatory.

<Modification 12>

The present embodiment and a number of modifications have been described above. These are presented by way of example only and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims are intended to cover such forms or modifications as would fall within the scope and spirit of the invention.

<Hardware Configuration>

FIG. 7 is a diagram showing a hardware configuration example of the parameter vector value proposal apparatus 100, 500. As shown in FIG. 7, the parameter vector value proposal apparatus 100, 500 include a processing circuit 71, a main storage device 72, an auxiliary storage device 73, a display device 74, an input device 75, and a communication device 76. The processing circuit 71, the main storage device 72, the auxiliary storage device 73, the display device 74, the input device 75, and the communication device 76 are coupled to each other via a bus.

The processing circuit 71 executes a parameter vector value proposal program read from the auxiliary storage device 73 to the main storage device 72, and functions as a search space determination unit 102, an extraction unit 103, a proposal unit 104 and a control unit 105. The main storage device 72 is a memory, such as a RAM (Random Access Memory). The auxiliary storage device 73 is an HDD (Hard Disk Drive), an SSD (Solid State Drive), a memory card, or the like. The main storage device 72 and the auxiliary storage device 73 function as a storage unit 101.

The display device 74 displays various kinds of information. The display device 74 is, for example, a display, a projector, or the like.

The input device 75 is an interface for operating a computer. The input device 75 is, for example, a keyboard, a mouse, or the like. The display device 74 and the input device 75 may be configured as a touch panel. The communication device 76 is an interface for communicating with another device, such as an observation apparatus 200.

A Program executed on a computer is recorded in a computer-readable storage medium, such as a CD-ROM, a memory card, a CD-R, and a DVD (Digital Versatile Disc), as an installable or executable format file, and is delivered as a computer program product.

A program executed on a computer may be stored in a computer connected to a network, such as the Internet, and may be provided as a program downloadable via the network. Further, the program executed on the computer may be provided via the network, such as the Internet, without being downloaded.

A program executed on a computer may be provided by incorporating it into a ROM or the like in advance. The program executed on the computer has a module configuration which is included among the functional configurations (functional blocks) of the parameter vector value proposal apparatus 100, 500 and which includes a functional block that can be realized by the program. As actual hardware, each functional block is loaded onto the main storage device 72 when the processing circuit 71 reads a program from the storage medium and executes the program. That is, each of the above functional blocks is generated on the main storage device 72.

Instead of realizing part or all of the above-mentioned functional blocks by software, they may be realized by hardware such as an IC (Integrated Circuit). Where each function is realized by using a plurality of processors, each processor may realize one function, or may realize two or more functions.

The operation mode of the computer that realizes the parameter vector value proposal apparatus 100, 50 may be arbitrarily determined. For example, the parameter vector value proposal apparatus 100, 50 may be realized by one computer. Further, for example, the parameter vector value proposal apparatus 100, 50 may be operated as a cloud system on the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A parameter vector value proposal apparatus, comprising:
a storage device that stores observation data, which is a set of pairs each consisting of a parameter vector value representing a point in a D-dimensional space (D is an integer of 2 or more) and an observation value of an objective function at the point; and
processing circuitry configured to:
determine, as a low-dimensional search space, an R-dimensional affine subspace (R is an integer that is not less than 1 and less than D) that passes through a point represented by a predetermined parameter vector value in the D-dimensional space;
extract, as extracted data, a set of pairs corresponding to one or more points at which similarity to a point included in the low-dimensional search space are equal to or more than a predetermined value, the one or more points being among one or more points in the D-dimensional space represented by one or more parameter vector values included in the observation data stored in the storage device; and
propose a parameter vector value representing a point at which a value of the objective function is to be observed next, based on the extracted data.

2. The parameter vector value proposal apparatus according to claim 1, wherein
the processing circuitry is further configured to refer to one or more points included in the D-dimensional space represented by the one or more parameter vector values included in the observation data stored in the storage device, and extract, as the extracted data, a set of pairs corresponding to one or more points at which a maximum similarity, which is the maximum value of the similarities to all points included in the low-dimensional search space, is equal to or more than a predetermined value.

3. The parameter value vector proposal device according to claim 1, wherein
the processing circuitry is further configured to refer to one or more points in the D-dimensional space represented by the one or more parameter vector values included in the observation data stored in the storage device, and extract, as the extracted data, a set of the pairs corresponding to one or more points at which degrees of similarity to a point included in the low-dimensional search space are within a predetermined percentage in descending order.

4. The parameter vector value proposal apparatus according to claim 1, wherein
the processing circuitry calculates the similarity between two points in the D-dimensional space, from components of orthogonal complement space of linear subspace accompanying the R-dimensional affine subspace, which is the low-dimensional search space included in the D-dimensional space.

5. The parameter value vector proposal device according to claim 1, wherein
a kernel function that calculates the similarity has a length scale as a hyperparameter; and
the processing circuitry is further configured to refer to one or more points included in the D-dimensional space represented by one or more parameter vector values included in the observation data stored in the storage device, and extract, as the extracted data, a set of pairs corresponding to one or more points at which distances to a point included in the low-dimensional search space are equal to or less than a coefficient multiple of the length scale.

6. The parameter vector value proposal apparatus according to claim 1, wherein
a kernel function that calculates the similarity has a length scale as a hyperparameter; and
the processing circuitry is further configured to refer to one or more points included in the D-dimensional space represented by the one or more parameter vector values included in the observation data stored in the storage device, and extract, as the extracted data, a set of pairs corresponding to one or more points at which D distances in coordinate axis directions of the D-dimensional space to a point included in the low-dimensional search space are equal to or less than a coefficient multiple of the length scale.

7. The parameter vector value proposal apparatus according to claim 1, wherein
a kernel function that calculates the similarity has a length scale vector as a hyperparameter; and
the processing circuitry is further configured to:
refer to one or more points in the D-dimensional space represented by the one or more parameter vector values included in the observation data stored in the storage device, and extract, as the extracted data, a set of pairs corresponding to one or more points at which a square of a normalized Euclidean distance to a point included in the low-dimensional search space is equal to or less than a predetermined value, and
in the calculation of the square of the normalized Euclidean distance, adopt a value of each element of the length scale vector as a standard deviation corresponding to each coordinate axis direction of the D-dimensional space.

8. The parameter vector value proposal apparatus according to claim 1, wherein
a kernel function that calculates the similarity has a length scale vector as a hyperparameter; and
the processing circuitry is further configured to refer to one or more points included in the D-dimensional space represented by the one or more parameter vector values included in the observation data stored in the storage device, and extract, as the extracted data, a set of pairs corresponding to one or more points at which all D distances in coordinate axis directions of the D-dimensional space with respect to points included in the low-dimensional search space are equal to or less than a coefficient multiple of the length scale.

9. The parameter vector value proposal apparatus according to claim 1, wherein
a kernel function that calculates the similarity has a length scale as a hyperparameter; and
the processing circuitry is further configured to refer to one or more points included in the D-dimensional space represented by the one or more parameter vector values included in the observation data stored in the storage device, and extract, as the extracted data, a set of pairs corresponding to one or more points at which distances to a point included in the low-dimensional search space are within a predetermined percentage in ascending order.

10. The parameter vector value proposal apparatus according to claim 1, wherein
a kernel function that calculates the similarity has a length scale vector as a hyperparameter; and
the processing circuitry is further configured to:
refer to one or more points in the D-dimensional space represented by the one or more parameter vector values included in the observation data stored in the storage device, and extract, as the extracted data, a set of pairs corresponding to one or more points at which squares of normalized Euclidean distances to a point included in the low-dimensional search space are within a predetermined percentage in ascending order; and
in the calculation of the square of the normalized Euclidean distances, adopt a value of each element of the length scale vector as a standard deviation corresponding to the coordinate axis directions of the D-dimensional space.

11. The parameter vector value proposal apparatus according to claim 1, wherein
a kernel function that calculates the similarity has a length scale or a length scale vector as a hyperparameter; and
the processing circuitry is further configured to estimate the length scale or the length scale vector from the extracted data;
the storage device stores the length scale or the length scale vector estimated by the processing circuitry, and
the processing circuitry is further configured to extract the extracted data, based on the length scale or the length scale vector stored in the storage device.

12. The parameter vector value proposal apparatus according to claim 1, wherein
the processing circuitry is further configured to extract the extracted data from the observation data, based on a cumulative contribution ratio regarding the similarity.

13. A parameter vector value proposal method comprising:
determining, as a low-dimensional search space, an R-dimensional affine subspace (R is an integer that is not less than 1 and less than D) that passes through a point represented by a predetermined parameter vector value in a D-dimensional space (D is an integer of 2 or more);
extracting, as extracted data, a set of pairs corresponding to one or more points at which similarity to a point included in the low-dimensional search space are equal to or more than a predetermined value, the one or more points being among one or more points in the D-dimensional space represented by one or more parameter vector values included in the observation data stored in the storage device; and
proposing a parameter vector value representing a point at which a value of the objective function is to be observed next, based on the extracted data.

14. A parameter optimization method, comprising:
determining, as a low-dimensional search space, an R-dimensional affine subspace (R is an integer that is not less than 1 and less than D) that passes through a point represented by a predetermined parameter vector value in a D-dimensional space (D is an integer of 2 or more);
extracting, as extracted data, a set of pairs corresponding to one or more points at which similarity to a point included in the low-dimensional search space are equal to or more than a predetermined value, the one or more points being among one or more points in the D-dimensional space represented by one or more parameter vector values included in the observation data stored in the storage device;
proposing a parameter vector value representing a point at which a value of the objective function is to be observed next, based on the extracted data; and
observing the point to be observed next, based on the parameter vector value representing the point to be observed next.

* * * * *